(12) United States Patent
Callan et al.

(10) Patent No.: US 10,742,397 B2
(45) Date of Patent: Aug. 11, 2020

(54) METHOD AND SYSTEM FOR MANAGING DECENTRALIZED DATA ACCESS PERMISSIONS THROUGH A BLOCKCHAIN

(71) Applicants: Jonathan Sean Callan, Cambridge (GB); Keir Finlow-Bates, Kangasala (FI)

(72) Inventors: Jonathan Sean Callan, Cambridge (GB); Keir Finlow-Bates, Kangasala (FI)

(*) Notice: Subject to any disclaimer, the term of this patent is extended or adjusted under 35 U.S.C. 154(b) by 282 days.

(21) Appl. No.: 15/963,711

(22) Filed: Apr. 26, 2018

(65) Prior Publication Data

US 2019/0334700 A1    Oct. 31, 2019

(51) Int. Cl.
| | | |
|---|---|---|
| *H04L 9/06* | (2006.01) | |
| *H04L 9/08* | (2006.01) | |
| *H04L 9/32* | (2006.01) | |
| *G06F 16/27* | (2019.01) | |
| *G06F 16/182* | (2019.01) | |

(52) U.S. Cl.
CPC ........ *H04L 9/0643* (2013.01); *G06F 16/1834* (2019.01); *G06F 16/27* (2019.01); *H04L 9/0825* (2013.01); *H04L 9/3239* (2013.01); *H04L 9/3249* (2013.01); *H04L 9/3252* (2013.01); *H04L 2209/38* (2013.01)

(58) Field of Classification Search
CPC ... H04L 9/0643; H04L 9/0825; H04L 9/3239; G06F 16/1834
See application file for complete search history.

(56) References Cited

U.S. PATENT DOCUMENTS

| | | | |
|---|---|---|---|
| 7,822,209 B2 | 10/2010 | Fu et al. | |
| 9,805,210 B2 | 10/2017 | Nord | |
| 10,467,551 B2* | 11/2019 | Gayton | .................. G01C 21/00 |
| 10,536,445 B1* | 1/2020 | Lerner | .................... G06F 21/64 |
| 10,621,157 B2* | 4/2020 | Ventura | .................. H04L 9/3013 |
| 2017/0103167 A1* | 4/2017 | Shah | ...................... G06Q 50/24 |
| 2017/0140145 A1* | 5/2017 | Shah | ...................... G16H 80/00 |
| 2017/0243209 A1* | 8/2017 | Johnsrud | ........... H04M 15/8214 |
| 2018/0322587 A1* | 11/2018 | Linne | .................... H04L 9/3236 |
| 2019/0036928 A1 | 1/2019 | Meriac et al. | |
| 2019/0180266 A1* | 6/2019 | Sidhu | ...................... G06Q 20/20 |
| 2019/0188700 A1* | 6/2019 | August | .................. H04L 9/0825 |
| 2019/0197532 A1* | 6/2019 | Jayachandran | ....... H04L 9/0618 |

(Continued)

*Primary Examiner* — Ali Shayanfar

(57) ABSTRACT

A data management blockchain and protocol for controlling access to data, in which no central trusted authority is required, is presented. The data management blockchain and protocol comprises an initial announcement of public keys by a plurality of blockchain participants, through which each blockchain participant establishes an identity. Subsequently a first of the plurality of blockchain participants publishes data encrypted with a cryptographic key on the blockchain. A second of the plurality of blockchain participants is assigned as an owner of the data by an authority. Access to the data is granted or revoked to further participants by the second of the plurality of blockchain participants through signed permission messages published on the blockchain, and a corresponding hand-over of the cryptographic key by the first of the plurality of blockchain participants, allowing access to the data. Access to further data may be revoked by changing the cryptographic key used.

8 Claims, 16 Drawing Sheets

(56) References Cited

U.S. PATENT DOCUMENTS

| | | | |
|---|---|---|---|
| 2019/0197534 A1* | 6/2019 | Alastair | G06Q 20/3821 |
| 2019/0238525 A1* | 8/2019 | Padmanabhan | H04L 9/3236 |
| 2019/0340269 A1* | 11/2019 | Biernat | G06F 16/248 |
| 2019/0349426 A1* | 11/2019 | Smith | H04L 67/104 |

* cited by examiner

METHOD AND SYSTEM FOR MANAGING
DECENTRALIZED DATA ACCESS
PERMISSIONS THROUGH A BLOCKCHAIN

TECHNICAL FIELD

This disclosure relates to computer systems and methods concerned with publishing and subsequently granting or revoking access to data, and more specifically to the granting or revoking of access via a medium of a blockchain.

BACKGROUND

Distributed ledgers provided in, for example, a peer-to-peer network, such as the distributed ledger used in the Bitcoin cryptocurrency system, rely on a consensus system agreed upon by participants on the peer-to-peer network in order to add blocks of data to the distributed ledger. In such systems, participants examine proposed data blocks in order to verify that they conform to a network agreed standard, rather than relying on a third-party trusted central authority to authorize the addition of data. Such a system is known to those skilled in the art as a blockchain.

Blockchains are of interest to manufacturers of Internet of Things devices, such as but not limited to: smart meters, network connected sensor devices, connected cars, wearable smart devices, connected fitness monitors, connected locationing devices, connected thermostats, smart speakers, smart locks, medical devices, smart home appliances, smart thermostats, connected surveillance cameras, connected kitchen appliances, as a blockchain may be used to record data from such devices or appliances for retrieval by an interested party in a decentralized manner, that is, without requiring a centralized database or other data store and an associated company or organization to manage said centralized database or other data store.

Blockchains are also of interest to other parties generating and distributing attributable data, for example but not limited to: credit rating services producing credit-worthiness data, trading services producing financial and exchange data, identity proving services, organizations producing or processing medical data, and organizations producing research data. Again, the interest is due to the decentralized nature of blockchains and the absence of a need for a central authority.

In a centralized system there is by default a central authority, which may allow or deny access to specific data by various parties using the system.

However, centralized systems have a number of problems. The central authority may have access to or the ability to gain access to and read the data in the system. Furthermore, central authorities usually charge for their services, resulting in higher costs for users of the system. Finally, the central authority may have the power to arbitrarily exclude or expel users from the system, or may even shut down the entire system.

It is therefore the intention of the present disclosure to address the problem of ensuring that an owner of data may correctly authorize or revoke access to said data produced by a data generator for use by a consumer of the data in a decentralized fashion without recourse to a central authority.

SUMMARY

In accordance with the present disclosure, a solution is provided for recording a data on a blockchain in an encrypted manner, attributing the data, and permitting or subsequently revoking access to the data. For the purposes of this disclosure, henceforth: a device or entity producing the data is referred to as a "data generator", a device or entity controlling who may access data is referred to as a "data owner", a device or entity that assigns ownership of the data to the data owner is referred to as an "authorizer", and a device or entity wishing to access the data is referred to as a "data receiver".

Blockchain validators, comprising, in a preferred embodiment of the present disclosure, a plurality of network connected devices participating in maintaining and extending the blockchain, may receive data and messages over the peer-to-peer network, which they may package into data blocks for potential inclusion in the blockchain. Some of these data blocks may comprise encrypted data submitted by a data generator. Data blocks may also comprise a number of control messages instructing participants on the blockchain to take specific action. Such control messages are referred to in the present disclosure as "records". If the validators deem a record to be valid, that is, it complies with protocols and rules of the blockchain, the validators may add the record to the blockchain.

In a preferred embodiment, a subset of the plurality of network connected devices participating on the blockchain, either as: validators, clients, or some other form of participation, and with each member of the subset comprising a network connected device comprising one or more processors, and storage media comprising computer instructions, said subset of the plurality of network connected devices being connectable via a network to each other, are arranged such that when computer instructions are executed on the one or more processors of a one or more of the subset of the plurality of network connected devices, operations are caused for enabling a decryption by a data receiver of a data package encrypted with a symmetric key.

In an embodiment, operations may commence by a first of the plurality of network connected devices, namely a data generator, generating and transmitting a data package encrypted with a symmetric key to a blockchain.

Subsequently a second of the plurality of network connected devices, namely an authorizer, may transmit an assignment record to the blockchain, said assignment record assigning ownership of data produced by the data generator to a third of the plurality of network connected devices, namely a data owner.

The data owner may then transmit a permission record to the blockchain, said permission record granting permission to a fourth of the plurality of network connected devices, namely a data receiver, granting permission to access the data produced by the data generator.

The data generator, on detecting the permission record on the blockchain, either by examining the blockchain file or through communication by an other trusted party, may then verify the permission record.

In this instance of the current embodiment, the data generator may verify the permission record by checking that the assignment record assigning ownership to the data owner is correctly digitally signed by the authorizer, and that the permission record is correctly digitally signed by the data owner.

In other embodiments a verification may be performed by the other trusted party, and the other trusted party may inform the data generator of the validity of the permission record.

In further embodiments the verification may be performed by blockchain validators before including the assignment record or the permission record in a block for inclusion on the blockchain. If the verification fails, the blockchain validators may reject the permission record or the assignment record, thereby ensuring that a record that fails to verify is never included on the blockchain. Under this embodiment there may therefore be no need for a data generator or validator to validate records.

On successful verification, the data generator may then release the symmetric key to the data receiver.

The data generator may then retrieve the data package from the blockchain, and decrypt the data package by using the symmetric key.

In alternative versions of the embodiment, the assignment record may be created and transmitted to the blockchain by the authorizer before the data generator has transmitted a data package to the blockchain. Similarly the permission record may be created and transmitted to the blockchain by the data owner before the data generator has transmitted a data package.

In another embodiment, the data package may comprise a pointer to a location of a further data, said further data also encrypted with the symmetric key by the data generator, and stored on a one or more of: a computer server, a database, a file system, a removable computer data storage medium.

In yet another embodiment, the data generator may use the symmetric key to encrypt a plurality of data packages, transmitted to the blockchain over a period of time. Through this, the data generator may provide a stream of encrypted data to the blockchain.

An embodiment of the present disclosure may provide for a multi-signature authorization of ownership of the data generated by the data generator.

In this embodiment, a second plurality of network connected devices may form a subset of the plurality of network connected devices, with each member of the second plurality of network connected devices performing a role of authorizer, such that each member transmits an assignment record to the blockchain. Each assignment record then asserts ownership of the data package to the data owner.

Subsequently the data generator may verify that each assignment record has been correctly signed by each member, before registering the data owner as an owner of the data package.

In another implementation of the current embodiment, the data generator may use a predetermined number, either determined absolutely or calculated as a percentage of the members of the second plurality of network connected devices, or through some other method. In this embodiment the data generator may register the data owner as the owner of the data package provided a number of assignment records are stored on the blockchain such that the number of assignment records is equal to or greater than the predetermined number, each of the assignment records specifies a same data owner, and each of the assignment records is correctly digitally signed by a corresponding authorizer that is a member of the second plurality of network connected devices.

An embodiment of the present disclosure may provide for a multi-signature allowance of access to the data generated by the data generator by a plurality of data owners.

In this embodiment, a third plurality of network connected devices may form a subset of the plurality of network connected devices, with each member of the third plurality of network connected devices performing a role of data owner, such that each member transmits a permission record to the blockchain. Each permission record then permits access to the data package by the data receiver.

Subsequently the data generator may verify that each permission record has been correctly signed by each member, before releasing the symmetric key to the data receiver.

In another implementation of the current embodiment, the data generator may use a predetermined number, either determined absolutely or calculated as a percentage of the members of the third plurality of network connected devices, or through some other method. In this embodiment the data generator may release the symmetric key to the data receiver, provided a number of permission records are stored on the blockchain such that the number of permission records is equal to or greater than the predetermined number, each of the permission records specifies a same data receiver, and each of the permission records is correctly digitally signed by a corresponding data owner that is a member of the third plurality of network connected devices.

A further embodiment of the current disclosure allows for a subsequent revocation of access to data packages submitted to the blockchain by the data generator after access has been granted to a data receiver.

In this embodiment, in which the authorizer may have previously transmitted an assignment record to a blockchain assigning ownership of data produced by the data generator to a data owner, subsequently a revocation record may be transmitted to the blockchain by the data owner revoking permission previously granted to the data receiver.

Subsequently, the data generator may verify that the revocation record is digitally signed by the data owner, and then may perform the following actions: the data generator computes a new symmetric key, encrypts a one or more future data packages with the new symmetric key, and transmits the one or more future data packages encrypted with the new symmetric key to the blockchain.

In this embodiment, the symmetric key may be used by the data generator to encrypt a plurality of data packages, transmitted to the blockchain during a first period of time, and the new symmetric key may be used to encrypt a second plurality of data packages over a second period of time, such that the second period of time starts, and the revocation record is recorded on the blockchain, after the first period of time ends.

In a preferred embodiment of this disclosure the authorizer, the data owner, the data receiver, and the data generator may comprise distinct entities. In other embodiments some or all of these roles may be undertaken by a same entity.

For example, in other embodiments the following may apply: the data generator may also comprise the data owner; or the data generator may also comprise the data authorizer; or the data owner may also comprise the data authorizer; or the data authorizer may also comprise the data generator and the data owner; or the data generator may also comprise the authorizer, and the data owner may also comprise the data receiver.

Those skilled in the art may determine that there are a total of at least fifteen combinations for single entities to perform single or multiple roles of: data generator, authorizer, data owner, data receiver.

Similarly, in an embodiment where there are a plurality of authorizers, a one or more of the authorizers may also perform the function of one or more of: a data generator, a data owner, a data receiver.

Similarly, in an embodiment where there are a plurality of data owners, a one or more of the data owners may also perform the function of one or more of: an authorizer, a data generator, a data receiver.

Through these various embodiments detailed above, data may be recorded on a blockchain in an encrypted manner by the data generator, ownership of the data may be attributed to a data owner by an authorizer, and permitting or subsequently revoking access to the data by a data receiver may be allowed by a data owner.

Those skilled in the art will further appreciate the advantages and superior features found in this disclosure together with other important aspects thereof on reading the detailed description that follows in conjunction with the drawings.

BRIEF DESCRIPTION OF THE DRAWINGS

The components in the figures are not necessarily to scale, emphasis instead being placed upon illustrating the principles of the present disclosure. In the figures, like reference numerals designate corresponding parts throughout the different views.

DETAILED DESCRIPTION

Figure 1:
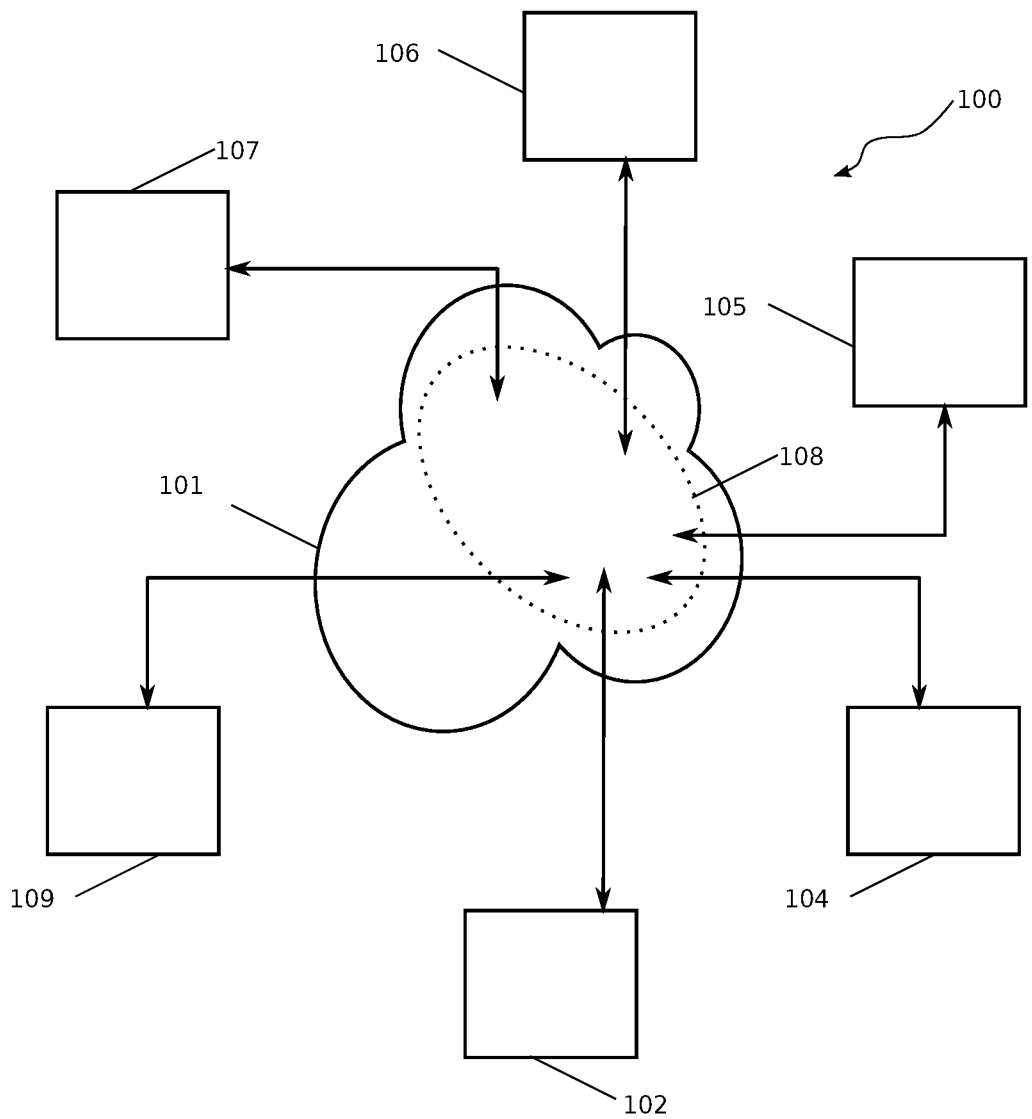
FIG. 1 illustrates a peer-to-peer network with a plurality of network connected devices connected to the peer-to-peer network, performing the roles of a validator, a data generator, an authorizer, a data owner and a data receiver, maintaining and extending a blockchain, in accordance with an embodiment of the present disclosure.

Aspects of this disclosure will be described in the context of an exemplary system of a plurality of network connected devices communicating through the medium of a peer-to-peer network system 100, thereby implementing a blockchain, as shown schematically in FIG. 1.

As depicted, a peer-to-peer network 108 is embodied within a packet switched network 101, through the interconnection of the plurality of network connected devices on the peer-to-peer network 108.

Devices connected to the peer-to-peer network 108 may include data generators, for example a network connected device 102, that may generate data. Such a network connected device 102 may embody a data generator.

Other devices connected to the peer-to-peer network 108 may include network connected devices acting as communication nodes, for example network connected device 104 whose role is to maintain a list of other devices connected through the peer-to-peer network, and to forward on received network messages to those devices on the list, possibly independently, or possibly as a response to a request from another network connected device. As one skilled in the art will be aware, no individual communication node is required to have a complete list of all devices, as the process of peer-to-peer networking only requires that a union of a set of all communication nodes contains a complete list of all devices on the peer-to-peer network, and for every pair of network connected devices there is a network route from one device to the other, possibly via a set of one or more nodes. Therefore, the only requirement to be a participant on the peer-to-peer network is to establish a connection to one or more of the communication nodes on said network.

Further devices connected via the peer-to-peer network 108 may include blockchain validators, for example network connected device 109, acting as a validator node or "miner", whose role may be to act as a communication node, and may also be to receive messages, records and other transaction or data messages from the peer-to-peer network 108, process them, and transmitting the results of said processing back to the peer-to-peer network 108 for potential inclusion in the blockchain.

Further devices connected via the peer-to-peer network may include authorizers, for example a network connected device 105, that may authorize ownership of data generated by data generators. Such a network connected device 105 may embody an authorizer.

Further devices connected via the peer-to-peer network may include data owners, for example a network connected device 106, that may receive ownership of data generated by data generators, by authority of an authorizer. Such a network connected device 106 may embody a data owner.

Further devices connected via the peer-to-peer network may include data receivers, for example a network connected device 107, that may receive a permission to access data generated by data generators, said permission being granted by a data owner. The permission may subsequently be revoked, as described in methods and processes below. Such a network connected device 107 may embody a data receiver.

The devices described above may be implemented through a system comprising a one or a plurality of: a general purpose microprocessor, a digital signal processor (DSP), an application specific instruction set processor (ASIP), a field programmable gate array (FPGA), a dedicated application specific integrated chip (ASIC), or other equivalent integrated or discrete logic circuitry and peripheral circuitry, connected to a tangible storage medium containing instructions which when executed effect methods and techniques described below. The techniques additionally, or alternatively, may be realized at least in part by a computer-readable communication medium or record carrier, that carries or communicates code in the form of instructions or data structures and that can be accessed, read, and/or executed by a computer.

The devices described above may connect to the peer-to-peer network 108 through a direct connection to the packet switched network 101 with a wired connection, or through a wireless connection by association with a wireless access point, a cellular base station, a Bluetooth connection, or other means of connection.

Figure 2A:
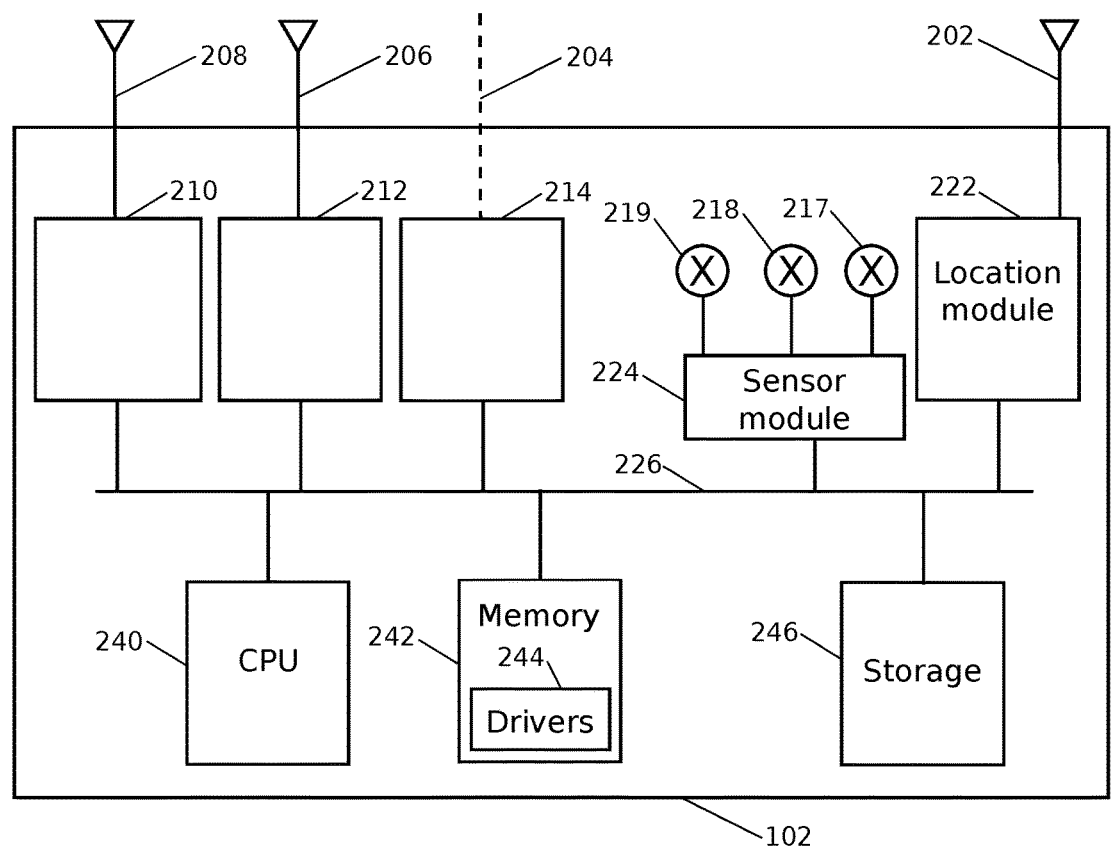
FIG. 2A illustrates a network connected device and associated sensors and other data producing modules that may be utilized in the generation and submission of a data record, in accordance with an embodiment of the present disclosure.

An embodiment of the network connected device 102 is presented in FIG. 2A, and is now discussed in further detail. The network connected device 102 may comprise a one or more central processing units (CPU) 240 capable of executing instructions stored in a memory 242, and controlling other peripheral components through drivers 244 stored within the memory 242.

Further storage 246 may be present, which may comprise a cryptographically secure partition or component where cryptographic keys may be securely stored.

The network connected device 102 may comprise a network module 214, which may consist of a direct wired connection to a packet switched network through a cable 204.

The network connected device 102 may comprise a wireless network module 212, which may comprise wireless components comprising one or more wireless modules implemented in firmware or hardware, including a wireless local area network (WLAN) unit such as a Wi-Fi adapter utilizing an 802.11 protocol, a wireless wide area network (WWAN) unit such as Global System for Mobile communications (GSM), Long Term Evolution (LTE), or other cellular wireless data communication system. The wireless network module may comprise an antenna 206. The wireless components may provide network connectivity to a packet switched network and hence to the peer-to-peer network for the network connected device 102.

The network connected device 102 may comprise a Bluetooth network module 210, which may comprise wireless components comprising one or more Bluetooth modules implemented in firmware or hardware. The Bluetooth network module 210 may comprise an antenna 208. The Bluetooth components may provide network connectivity to a packet switched network and hence to the peer-to-peer network for the network connected device 102.

Components comprising the network connected device 102 may communicate through a bus 226, which may be implemented as a peripheral component interconnect express (PCIe) bus, a universal serial bus (USB), a universal asynchronous receiver/transmitter (UART) serial bus, a suitable advanced micro-controller bus architecture (AMBA) interface, a serial digital input output (SDIO) bus, or other equivalent interface.

Optionally, the network connected device 102 may also comprise an integrated location determining module 222, comprising one or more of: a global navigation satellite system (GNSS) receiver, a real-time kinematic (RTK) module, a magnetic navigation module, and an antenna 202 for said GNSS receiver or RTK module.

Optionally, the network connected device 102 may also comprise a sensor module 224, connected to one or more sensors or MEMS devices 217, 218, 219. Such sensors may comprise one or more of: an altimeter, a magnetometer, a gyroscopic sensor, an accelerometer, a thermometer, a pressure gauge, a light sensor, a camera, a microphone, an odometer, an infrared sensor, an ultrasonic sensor, a gas sensor, a smoke sensor, an alcohol sensor, a proximity sensor, a humidity sensor, a moisture sensor, a tilt sensor, a force sensor, an electrical resistance meter, a voltage meter, an electrical current meter, an other sensor type.

Figure 2B:
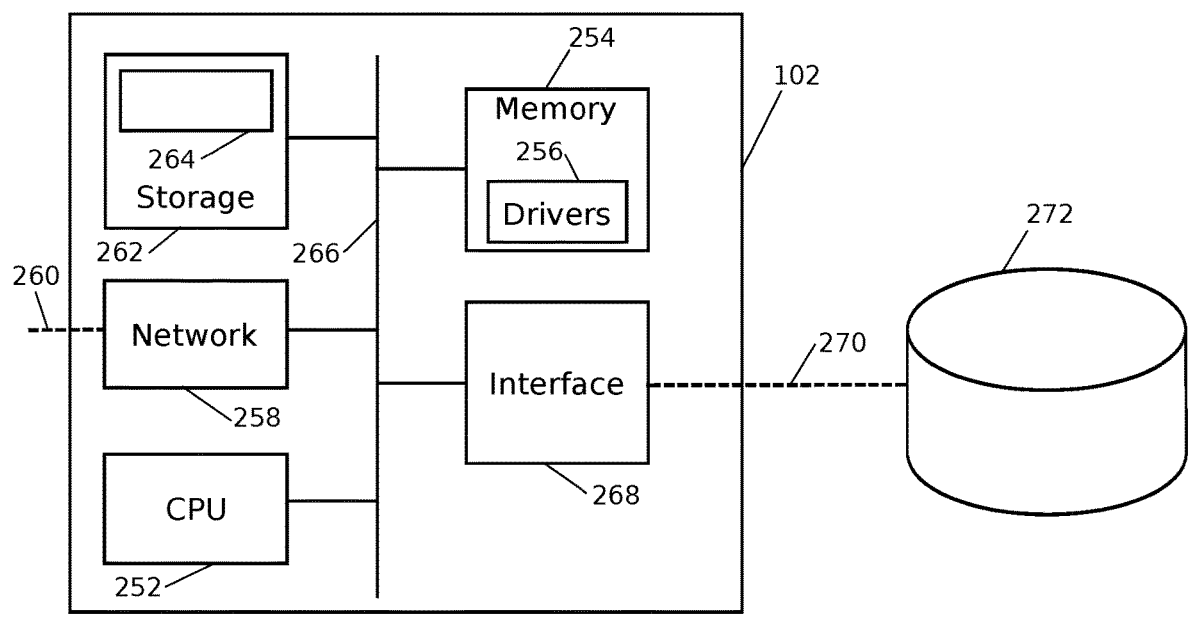
FIG. 2B illustrates a network connected device and associated database that may be utilized in the generation and submission of a data record, in accordance with an embodiment of the present disclosure.

In another embodiment of the network connected device 102, detailed in FIG. 2B, the network connected device 102 may comprise a data generator producing data through a processing of an other stored data, for example other data stored in a database 272. The database 272 may be instantiated internally to the network connected device 102, or it may comprise an instantiation on a separate device or machine communicated to through an external connection 270 and an interface 268 within the network connected device. The external connection may be a cable to a packet-switched network, either on a local area network or wide area network, an external serial connection, or through a wireless connection by association with a wireless access point, a cellular base station, a Bluetooth connection, or other means of connection.

Under this configuration, the network connected device 102 may may comprise a one or more central processing units (CPU) 252 capable of executing instructions stored in a memory 254, and controlling other peripheral components through drivers 256 stored within the memory 254.

Further storage 262 may be present, which may comprise a cryptographically secure partition 264 or component where cryptographic keys may be securely stored.

The network connected device 102 may comprise a network module 258, which may consist of a direct wired connection to a packet switched network through a cable 260 or through a wireless connection to a wireless local area network (WLAN) unit such as a Wi-Fi adapter utilizing an 802.11 protocol, a wireless wide area network (WWAN) unit such as Global System for Mobile communications (GSM), Long Term Evolution (LTE), or other cellular wireless data communication system.

Components comprising the network connected device 102 may communicate through a bus 266, which may be implemented as a peripheral component interconnect express (PCIe) bus, a universal serial bus (USB), a universal asynchronous receiver/transmitter (UART) serial bus, a suitable advanced micro-controller bus architecture (AMBA) interface, a serial digital input output (SDIO) bus, or other equivalent interface.

In the current disclosure various network connected devices may communicate over a blockchain through a use of messages submitted to, included in, and subsequently read from the blockchain. For the purposes of this disclosure, messages related to recording data, granting ownership of data, and permitting access to data are referred to as "records".

Figure 3:
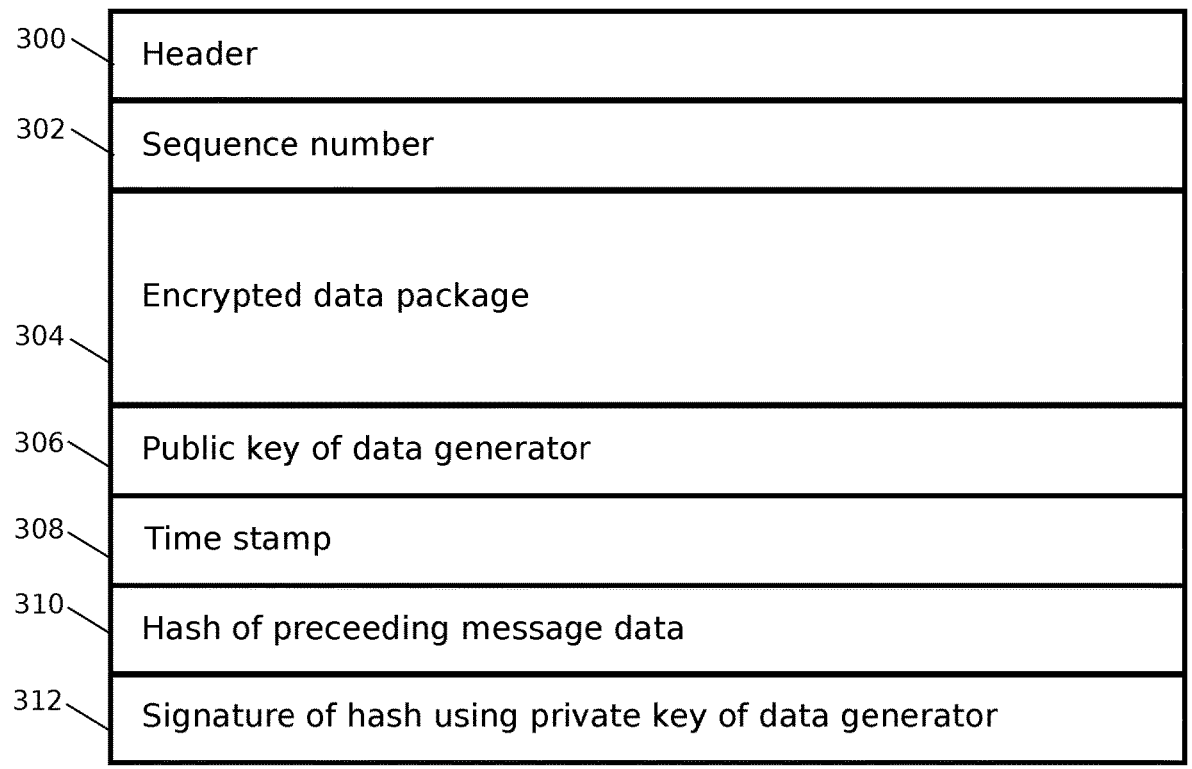
FIG. 3 is a block diagram illustrating a structure of a possible embodiment of a data record, in accordance with an embodiment of the present disclosure.

In FIG. 3 an embodiment of a data record is presented, through which data obtained or processed by the network connected device 102 henceforth referred to as a "data generator" may package and record data for transmission to the blockchain.

The data record may comprise a header 300, which may comprise: an identifier indicating that the data record contains a data, a size of the data, a protocol for the data, a structure of the data.

The data record may comprise a sequence number 302, which may indicate the data in the data record is a part of a sequence of data, and may indicate where in the sequence of data the data is positioned.

The data record may comprise an encrypted data package 304, comprising the data. The data may be encrypted with a symmetric key encryption algorithm such as: Blowfish, DES, IDEA, MARS, RC2-5, Rijndael or AES, Serpent, Triple-DES, Twofish, or some other symmetric key encryption algorithm. In an alternate embodiment the data package may not be encrypted.

The data record may comprise a public key of the data generator 306, which may be one of: an ECDSA public key, and ElGamal public key, a DSA public key, an RSA public key, or some other public key associated with an asymmetric key system.

In an alternate embodiment, the data record may comprise an identifier for the data generator 306. In the alternate embodiment, the data generator may previously or subsequently submit an identification record to the blockchain linking the identifier with a one or more public keys for the data generator 306. Other parties may subsequently determine a public key for the data generator 306 by examining the blockchain for said identification record. In general, in the descriptions that follow, where a party is identified by a public key the party may equally be identified by an other identifier, with said other identifier announced on the blockchain by an other identification record included in a block on the blockchain, said other identification record comprising one or more public keys.

The data record may comprise a time stamp 308. In an embodiment the time stamp may comprise a time at which the data was generated. In an alternate embodiment the time stamp may comprise a time at which the data record was constructed. The data record may also comprise a plurality of time stamps.

The data record may comprise a hash of all or part of a preceding data record contents 310. The hash may be calculated using a cryptographic hash algorithm, for example: SHA, RIPEMD, Whirlpool, Scrypt, HAS-160, BLAKE, or other cryptographic hash function applied to all or part of the preceding content of the message, where a hash output cannot be determined from a hash input other than by an application of the cryptographic hash function to the hash input.

The data record may also comprise a digital signature 312, generated with a digital signature algorithm using a private key associated with the public key 306 and the hash 310, in order to provide for a veracity of the data record. The digital signature algorithm used may be one of ECDSA, DSA, RSA, or some other secure asymmetric key digital signing algorithm.

Figure 4:
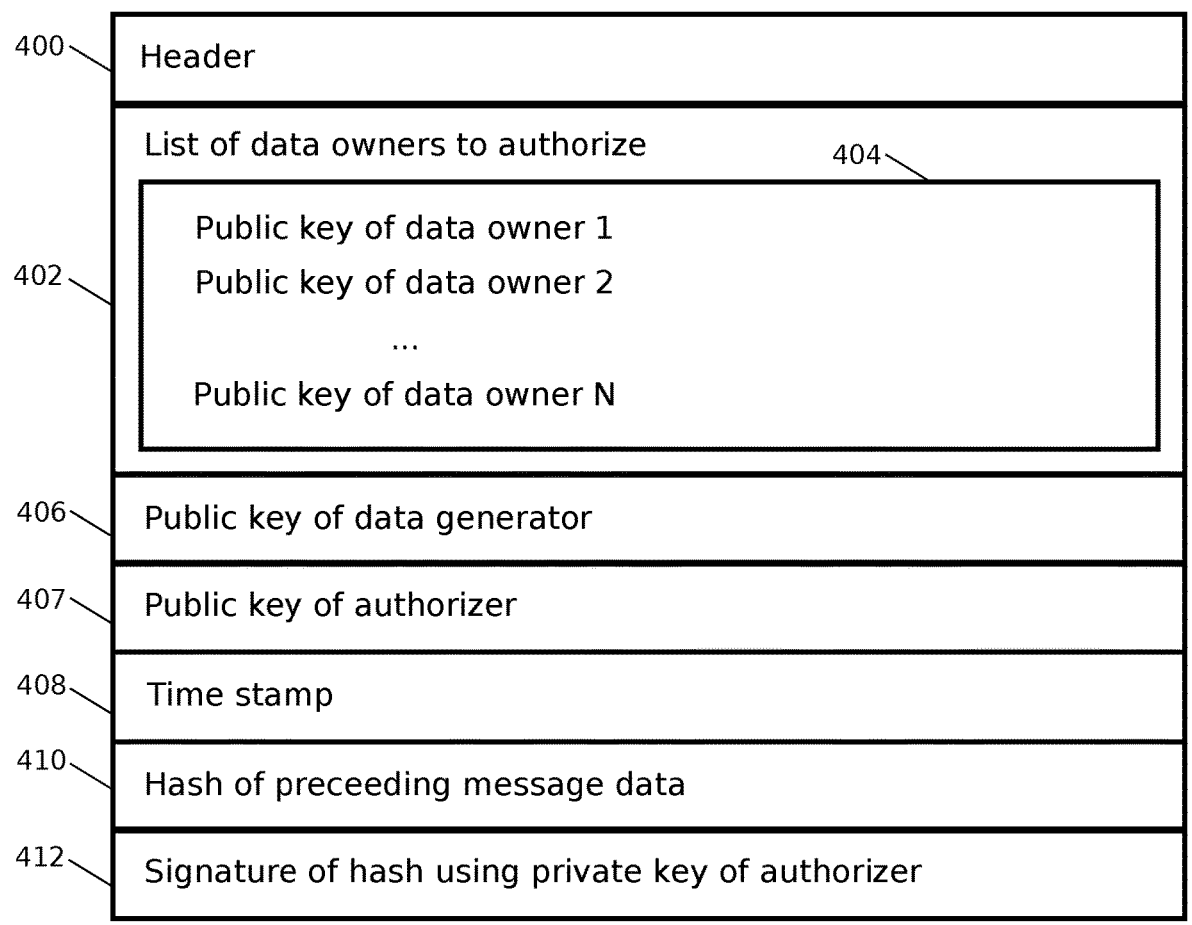
FIG. 4 is a block diagram illustrating a structure of a possible embodiment of an assignment record, in accordance with an embodiment of the present disclosure.

An embodiment of an assignment record, is presented in FIG. 4, through which a network connected device 105 henceforth referred to as a "authorizer" may authorize ownership of data produced the by the data generator 102.

The assignment record may comprise a header 400, which may comprise: an identifier indicating that the assignment record contains an authorization to own data, a size of the assignment record, a protocol for the authorization, a structure of other data comprising the assignment record.

The assignment record may comprise a list of data owners 402 to authorize, comprising a plurality of public keys 404, with each one of the plurality of public keys corresponding to a data owner authorized to own a data produced by a data generator and to allocate access to the data to other parties. Each of the plurality of public keys may be one of: an ECDSA public key, and ElGamal public key, a DSA public key, an RSA public key, or some other public key associated with an asymmetric key system.

The assignment record may comprise a public key of the data generator 406, which may be one of: an ECDSA public key, and ElGamal public key, a DSA public key, an RSA public key, or some other public key associated with an asymmetric key system.

The assignment record may comprise a public key of the authorizer 407, which may be one of: an ECDSA public key, and ElGamal public key, a DSA public key, an RSA public key, or some other public key associated with an asymmetric key system.

The assignment record may comprise a time stamp 408. In an embodiment the time stamp may comprise a time at which the assignment record was constructed. In another embodiment the time stamp may indicate when ownership of the data was assigned. The assignment record may also comprise a plurality of time stamps.

The assignment record may comprise a hash of all or part of a preceding assignment record contents 410. The hash may be calculated using a cryptographic hash algorithm, for example: SHA, RIPEMD, Whirlpool, Scrypt, HAS-160, BLAKE, or other cryptographic hash function applied to all or part of the preceding content of the message, where a hash output cannot be determined from a hash input other than by an application of the cryptographic hash function to the hash input.

The assignment record may also comprise a digital signature 412, generated with a digital signature algorithm using a private key associated with the public key of the authorizer 407 and the hash 410, in order to provide for the veracity of the assignment record. The digital signature algorithm used may be one of ECDSA, DSA, RSA, or some other secure asymmetric key digital signing algorithm.

Figure 5:
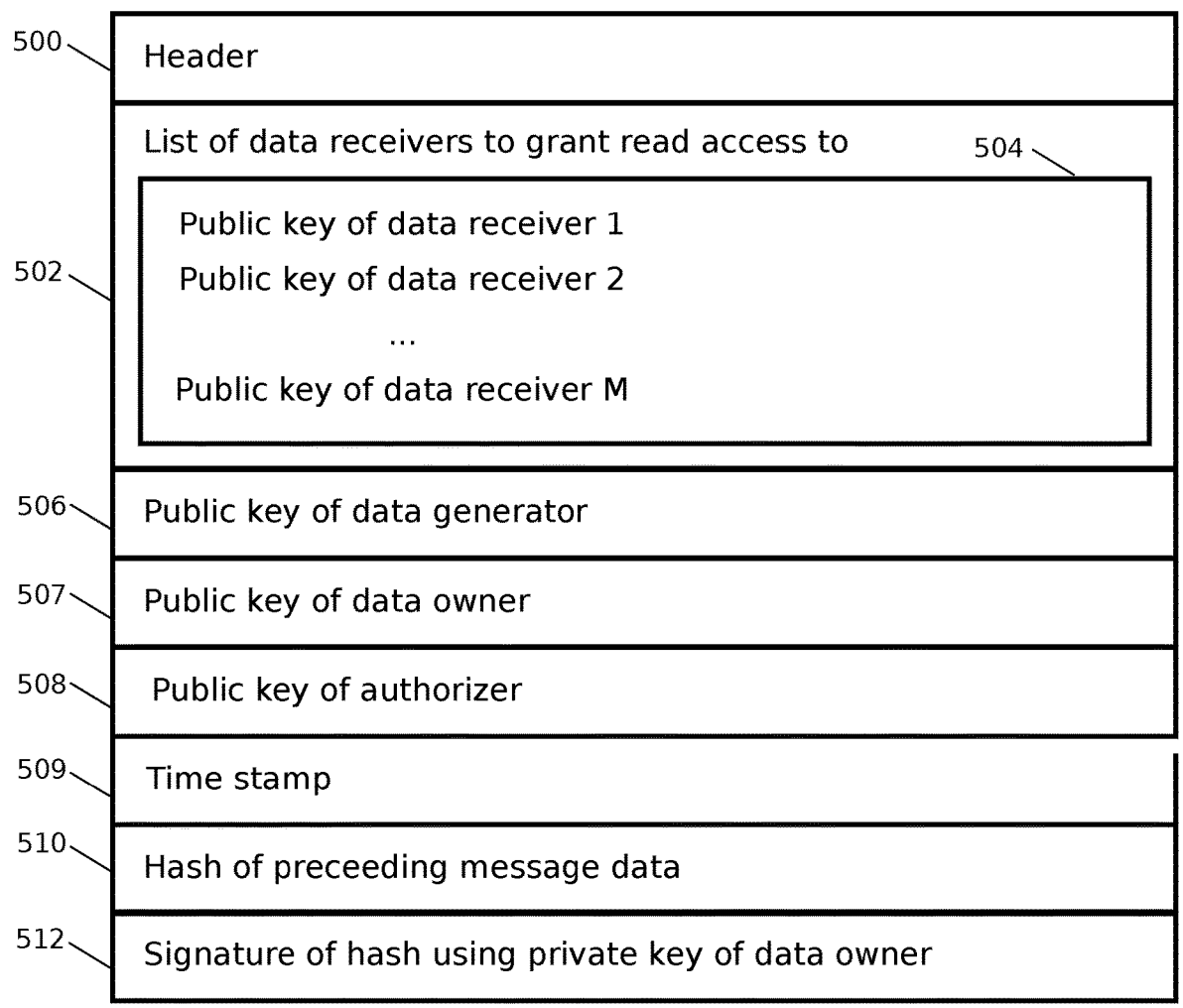
FIG. 5 is a block diagram illustrating a structure of a possible embodiment of a permission record, in accordance with an embodiment of the present disclosure.

An embodiment of a permission record, is presented in FIG. 5, through which a network connected device 106 henceforth referred to as a "data owner" may grant permission to access and read data produced by the data generator 102.

The permission record may comprise a header 500, which may comprise: an identifier indicating that the permission record contains a permission or consent to access or read data, a size of the permission record, a protocol for the consent, a structure of other data comprising the permission record.

The permission record may comprise a list of data receivers 502 to grant read access to, comprising a one or more public keys 504, with each one of the one or more public keys corresponding to a data receiver to whom to grant permission to access or read a data produced by a data generator. Each of the one or more public keys may be one of: an ECDSA public key, and ElGamal public key, a DSA public key, an RSA public key, or some other public key associated with an asymmetric key system.

The permission record may comprise a public key of the data generator 506, which may be one of: an ECDSA public key, and ElGamal public key, a DSA public key, an RSA public key, or some other public key associated with an asymmetric key system.

The permission record may comprise a public key of the data owner 507, which may be one of: an ECDSA public key, and ElGamal public key, a DSA public key, an RSA public key, or some other public key associated with an asymmetric key system.

The permission record may comprise a public key of the authorizer 508, which may indicate an identity of a party that granted authority to the data owner to own the data generated by the data generator. The public key of the authorizer may be one of: an ECDSA public key, and ElGamal public key, a DSA public key, an RSA public key, or some other public key associated with an asymmetric key system.

The permission record may comprise a time stamp 509. In an embodiment the time stamp may comprise a time at which the permission record was constructed. In another embodiment the time stamp may indicate when permission was assigned. The permission record may also comprise a plurality of time stamps.

The permission record may comprise a hash of all or part of a preceding permission record contents 510. The hash may be calculated using a cryptographic hash algorithm, for example: SHA, RIPEMD, Whirlpool, Scrypt, HAS-160, BLAKE, or other cryptographic hash function applied to all or part of the preceding content of the message, where a hash output cannot be determined from a hash input other than by an application of the cryptographic hash function to the hash input.

The permission record may also comprise a digital signature 512, generated with a digital signature algorithm using a private key associated with the public key of the data owner 507 and the hash 510, in order to provide for the veracity of the permission record. The digital signature algorithm used may be one of ECDSA, DSA, RSA, or some other secure asymmetric key digital signing algorithm.

Figure 6:
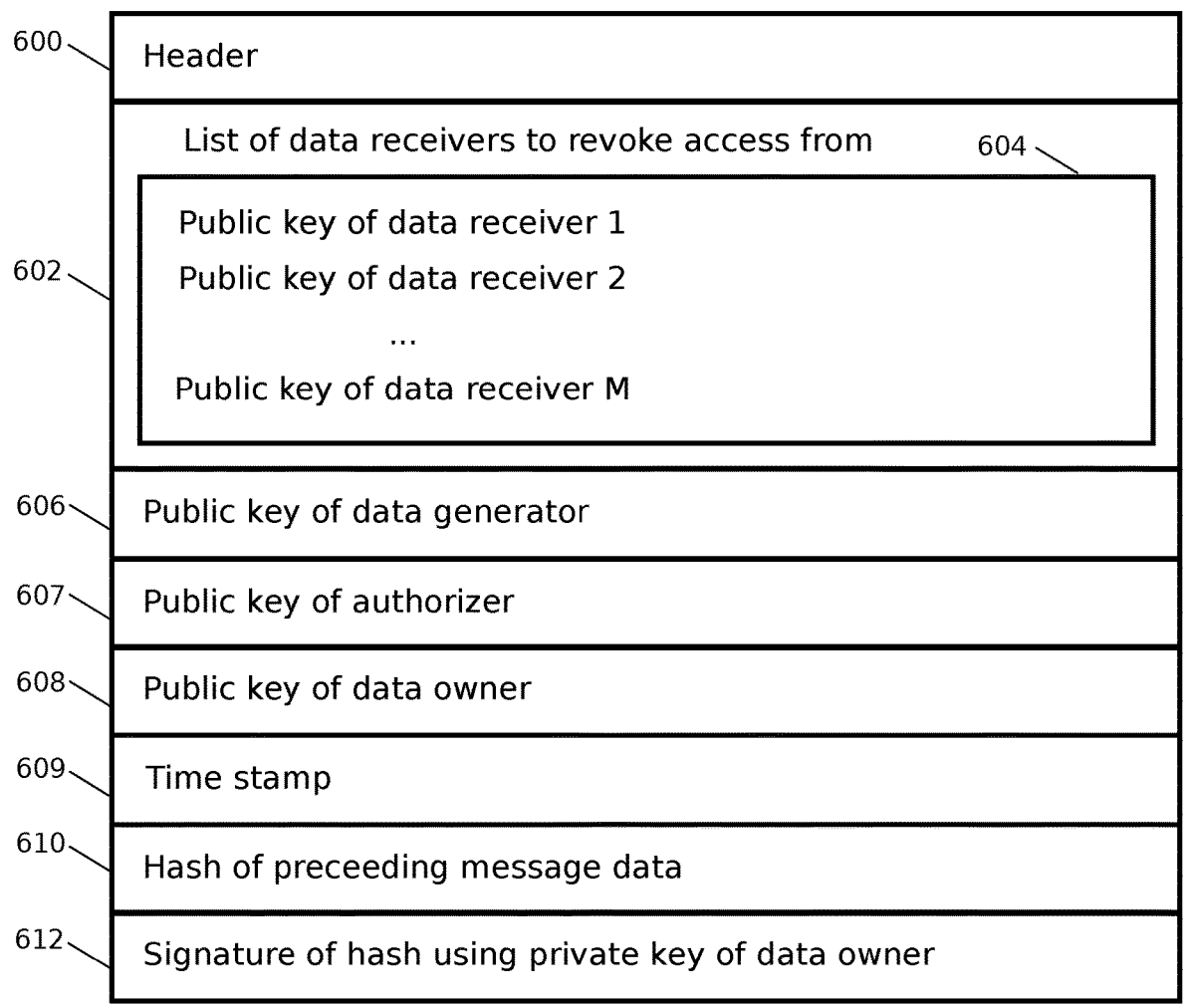
FIG. 6 is a block diagram illustrating a structure of a possible embodiment of a revocation record, in accordance with an embodiment of the present disclosure.

An embodiment of a revocation record, is presented in FIG. 6, through which the network connected device 106, namely the data owner, may revoke consent or permission from a data receiver 107 to access and read data produced by the data generator 102.

The revocation record may comprise a header 600, which may comprise: an identifier indicating that the revocation record contains a revocation of consent to access or read data, a size of the revocation record, a protocol for the revocation of consent, a structure of other data comprising the revocation record.

The revocation record may comprise a list of data receivers 602 for which to revoke read access, comprising a plurality of public keys 604, with each one of the plurality of public keys corresponding to a data receiver to revoke permission to access or read a data produced by a data generator. Each of the plurality of public keys may be one of: an ECDSA public key, and ElGamal public key, a DSA public key, an RSA public key, or some other public key associated with an asymmetric key system.

The revocation record may comprise a public key of the data generator 606, which may be one of: an ECDSA public key, and ElGamal public key, a DSA public key, an RSA public key, or some other public key associated with an asymmetric key system.

The revocation record may comprise a public key of the authorizer 607, which may indicate an identity of a party that granted authority to the data owner to own the data generated by the data generator, and therefore revoke access to said data. The public key of the authorizer may be one of: an ECDSA public key, and ElGamal public key, a DSA public key, an RSA public key, or some other public key associated with an asymmetric key system.

The revocation record may comprise a public key of the data owner 608, which may be one of: an ECDSA public key, and ElGamal public key, a DSA public key, an RSA public key, or some other public key associated with an asymmetric key system.

The revocation record may comprise a time stamp 609. In an embodiment the time stamp may comprise a time at which the revocation record was constructed. The revocation record may also comprise a plurality of time stamps.

The revocation record may comprise a hash of all or part of a preceding revocation record contents 610. The hash may be calculated using a cryptographic hash algorithm, for example: secure hash algorithm (SHA), RACE integrity primitives evaluation message digest (RIPEMD), Whirlpool, Scrypt, HAS-160, BLAKE, or other cryptographic hash function applied to all or part of the preceding content of the message, where a hash output cannot be determined from a hash input other than by an application of the cryptographic hash function to the hash input.

The revocation record may also comprise a digital signature 612, generated using a private key associated with the public key of the data owner 608 and the hash 610, in order to provide for the veracity of the revocation record. The digital signature algorithm used may be one of ECDSA, DSA, RSA, or some other secure asymmetric key digital signing algorithm.

Those skilled in the art will appreciate that embodiments above of the data record, the assignment record, the permission record, and the revocation record are examples of possible embodiments. In other embodiments of each, records may comprise elements in a different order, combinations of each record, and each record may comprise further elements.

Figure 7:
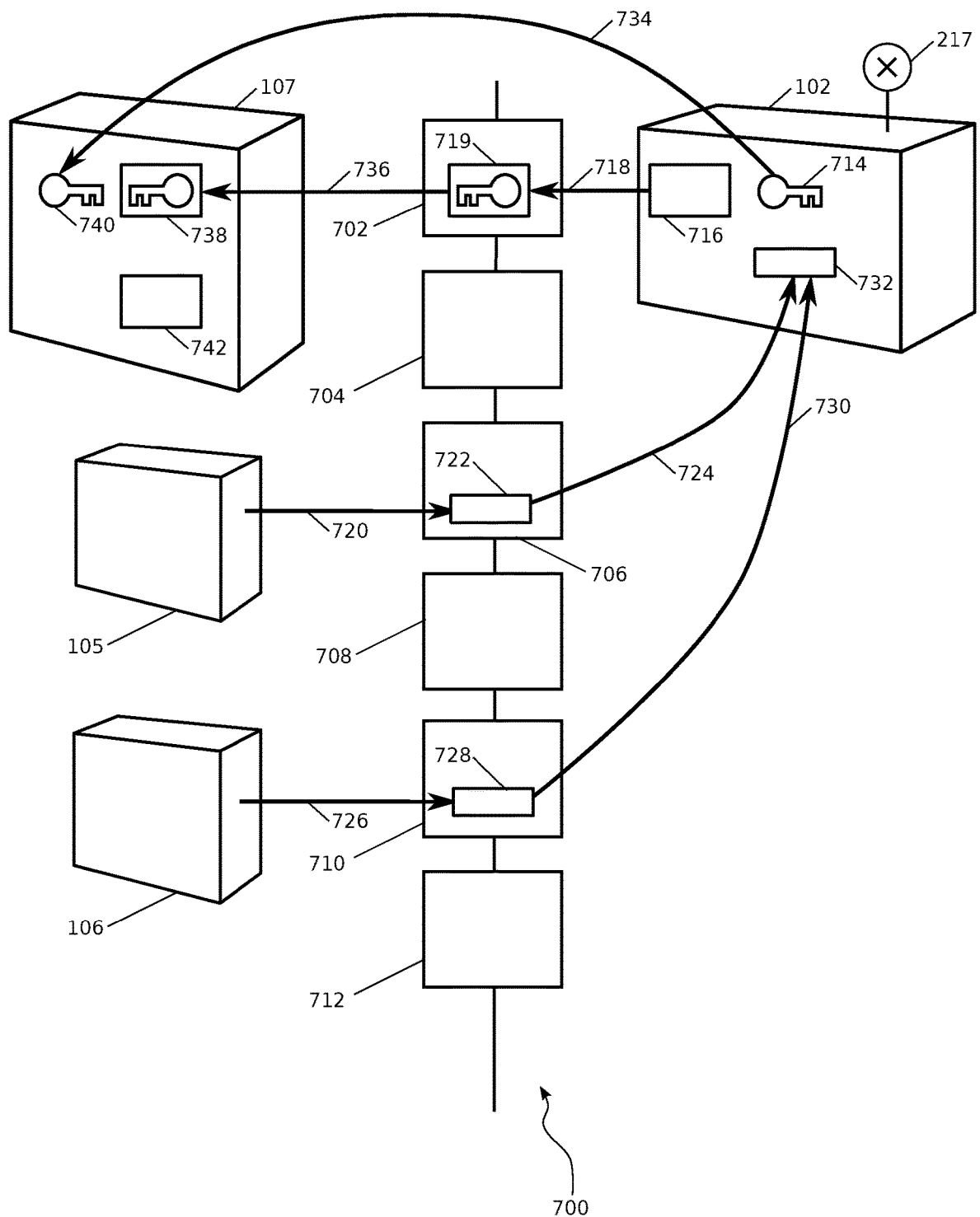
FIG. 7 is a diagram providing a general overview of a method and apparatus for recording a data on a blockchain in an encrypted manner, attributing the data, and permitting access to the data, in accordance with an embodiment of the present disclosure.

In FIG. 7 a possible embodiment of an apparatus for recording a data on a blockchain in an encrypted manner, attributing the data, and permitting access to the data, is presented.

In the embodiment a blockchain 700 may record transactions between a data generator 102, an authorizer 105, a data owner 106 and a data receiver 107.

The blockchain 700 may comprise a plurality of blocks (702, 704, 706, 708, 710, 712), in which data, records and transactions may be recorded. Blocks may be added to the blockchain 700 over time. An average time between additions of new blocks is known to those skilled in the art as a block generation rate.

In the embodiment actions may commence by the data generator 102 obtaining or creating a data 716, for example from a sensor 217.

The data generator 102 may then create a symmetric key 714, or in an alternate embodiment may retrieve from memory a symmetric key 714, and may encrypt the data 716.

The data generator 102 may then transmit the data 716 encrypted with the symmetric key 714 to the blockchain 700, where it may be included as a data record 719 in a blockchain block 702. In FIG. 7 an action of transmitting the data 716 is indicated by 718.

At a later time a block 704 may be added to the blockchain.

The authorizer 105 may submit an assignment record 722 to the blockchain 700, comprising an authorization of the data owner 106 to own data produced by the data generator 102. The assignment record 722 may be included in a block 706 by participants on the blockchain. In FIG. 7 an action of transmitting the assignment record 722 is indicated by 720.

At a later time a block 708 may be added to the blockchain.

The data owner 106 may submit a permission record 728 to the blockchain 700, comprising a message granting permission or consent to the data receiver 107 to view or access data produced by the data generator 102. The permission record 728 may be included in a block 710 by participants on the blockchain. In FIG. 7 an action of transmitting the permission record 728 is indicated by 726.

At a later time a block 712 may be added to the blockchain. Further blocks may be added at the block generation rate.

The data generator 102 may extract the permission record 728 and extract the assignment record 722 from the blockchain 700. The data generator 102 may then analyze the contents of the assignment record 722 and the permission record 728, to validate a plurality of digital signatures within the permission record and assignment record. In FIG. 7 an action of extracting the assignment record 722 is indicated by 724, and an action of extracting the permission record 728 is indicated by 730.

If the assignment record 722 and permission record 728 are determined to be valid by the data generator 102, the data generator 102 may then add the data receiver 107 specified in the permission record 728 to a permission list 732.

The data generator 102 may examine the permission list 732 to determine which participants in the blockchain system are to have access to the data recorded in the encrypted data record 719. In the current example the data generator may determine that the data receiver 107 is permitted to read and access the data.

The data generator 102 may then transmit a copy of the symmetric key 714 to the data receiver. In FIG. 7 an action of transmitting the symmetric key 714 is indicated by 734. In an embodiment of the present disclosure the action may comprise creating an encrypted copy of the symmetric key 714 using a public key of the data receiver 107, and subsequently transmitting the encrypted copy to the data receiver 107 the symmetric key 714 over a digital channel, for example a TCP/IP connection.

The data receiver 107 may then decrypt the encrypted copy of the symmetric key 740 using a private key associated with the public key of the data receiver, resulting in an unencrypted copy of the symmetric key.

The data receiver 107 may then scan the contents of the blockchain 700 for a data record 719 encrypted and transmitted by the data generator 102. On detecting the data record 719 the data receiver 107 may extract the data record 719 from the blockchain. In FIG. 7 an action of extracting the data record 719 is indicated by 736.

The data receiver 107 may then decrypt a copy 738 of the data record 719 with the unencrypted copy of the symmetric key, resulting in an unencrypted copy of the data record 742.

Those skilled in the art will appreciate that in the embodiment above, for illustrative purposes, a specific example of a data flow has been presented. In other examples a number of blocks added to the blockchain may differ, and an order and number of a creation and submission of various records presented may differ, a creation and addition of blocks to the blockchain 700 may differ, and other actions and steps may be taken in a different order.

Figure 8:
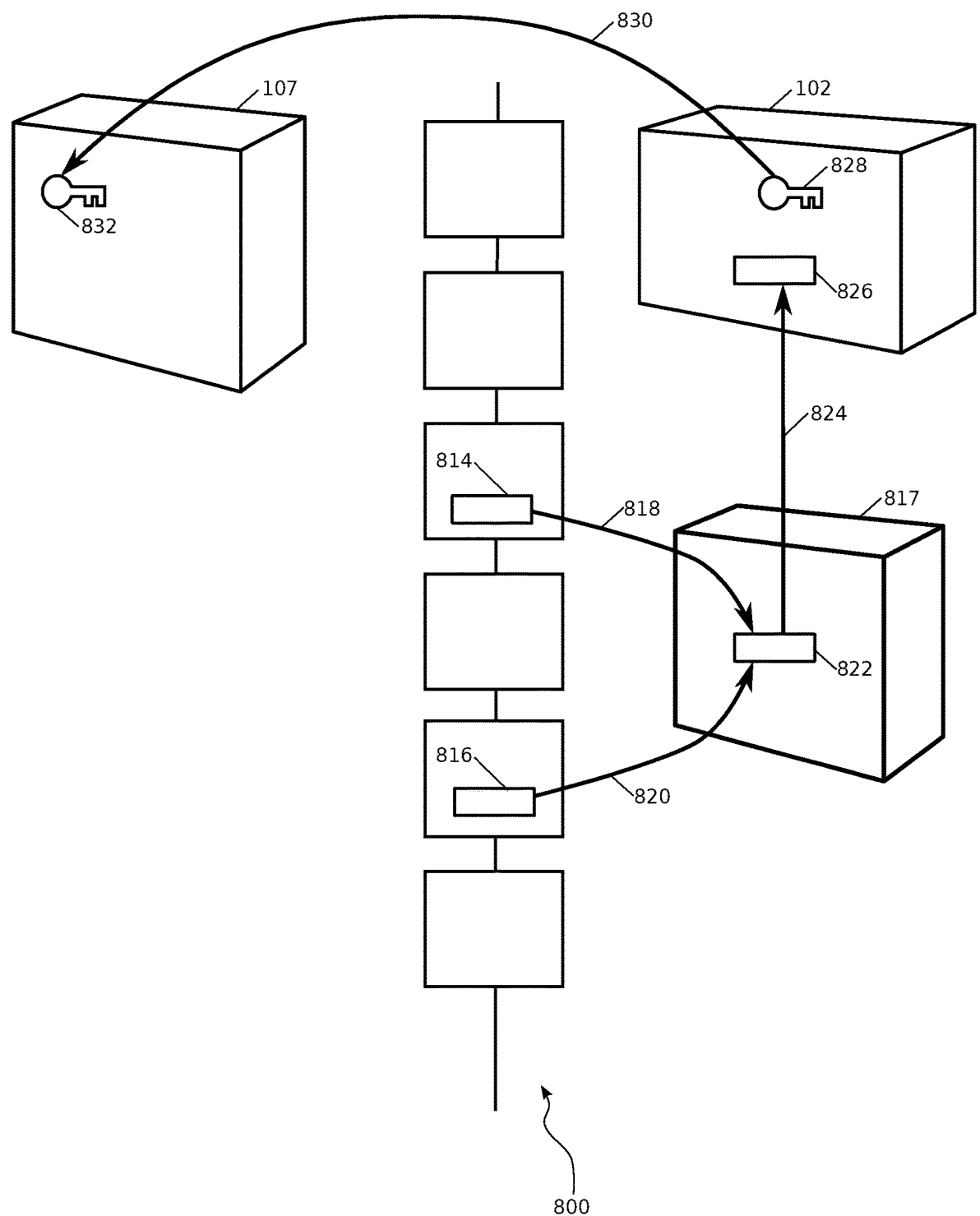
FIG. 8 is a diagram presenting a process for verification of an assignment record and a permission record by a third party, informing a data generator, and said data generator subsequently releasing a symmetric key to a data receiver, in accordance with an embodiment of the present disclosure.

An alternative embodiment is shown in FIG. 8 in which a validator 817 performs an action of extracting a permission record 816 and an assignment record 814 from a blockchain 800.

The validator 817 may extract the permission record 816 and extract the assignment record 814 from the blockchain 800. The validator 817 may then analyze contents of the assignment record 814 and the permission record 816, to validate a plurality of digital signatures within the permission record and assignment record. In FIG. 8 an action of extracting the assignment record 814 is indicated by 818, and an action of extracting the permission record 816 is indicated by 820.

If the assignment record 814 and permission record 816 are determined to be valid by the validator 817, the validator 817 may then retrieve a public key 822, or in an alternate embodiment an other identifier, of the data receiver 107, from the permission record 816.

The validator 817 may then transfer the public key 822 to the data generator 102. In FIG. 8 an action of transferring the public key 822 is indicated by 824.

The data generator may then add the public key 822 to a permission list 826, used to determine which participants on the blockchain 800 are to have access to a data recorded in an encrypted data record. In the current example the data generator may determine that the data receiver 107 is permitted to read and access the data.

The data generator 102 may then transmit a copy of a symmetric key 828, used for generating encrypted data records on the blockchain, to the data receiver 107. In FIG. 8 an action of transmitting the symmetric key 828 is indicated by 830. In an embodiment of the present disclosure the action may comprise creating an encrypted copy of the symmetric key 828 using the public key 822 of the data receiver 107, and subsequently transmitting the encrypted copy of the symmetric key 832 to the data receiver 107, over a digital channel, for example a TCP/IP connection.

The data receiver 107 may then decrypt the encrypted copy of the symmetric key 832 using a private key associated with the public key 822 of the data receiver 107, resulting in an unencrypted copy of the symmetric key.

Figure 9:
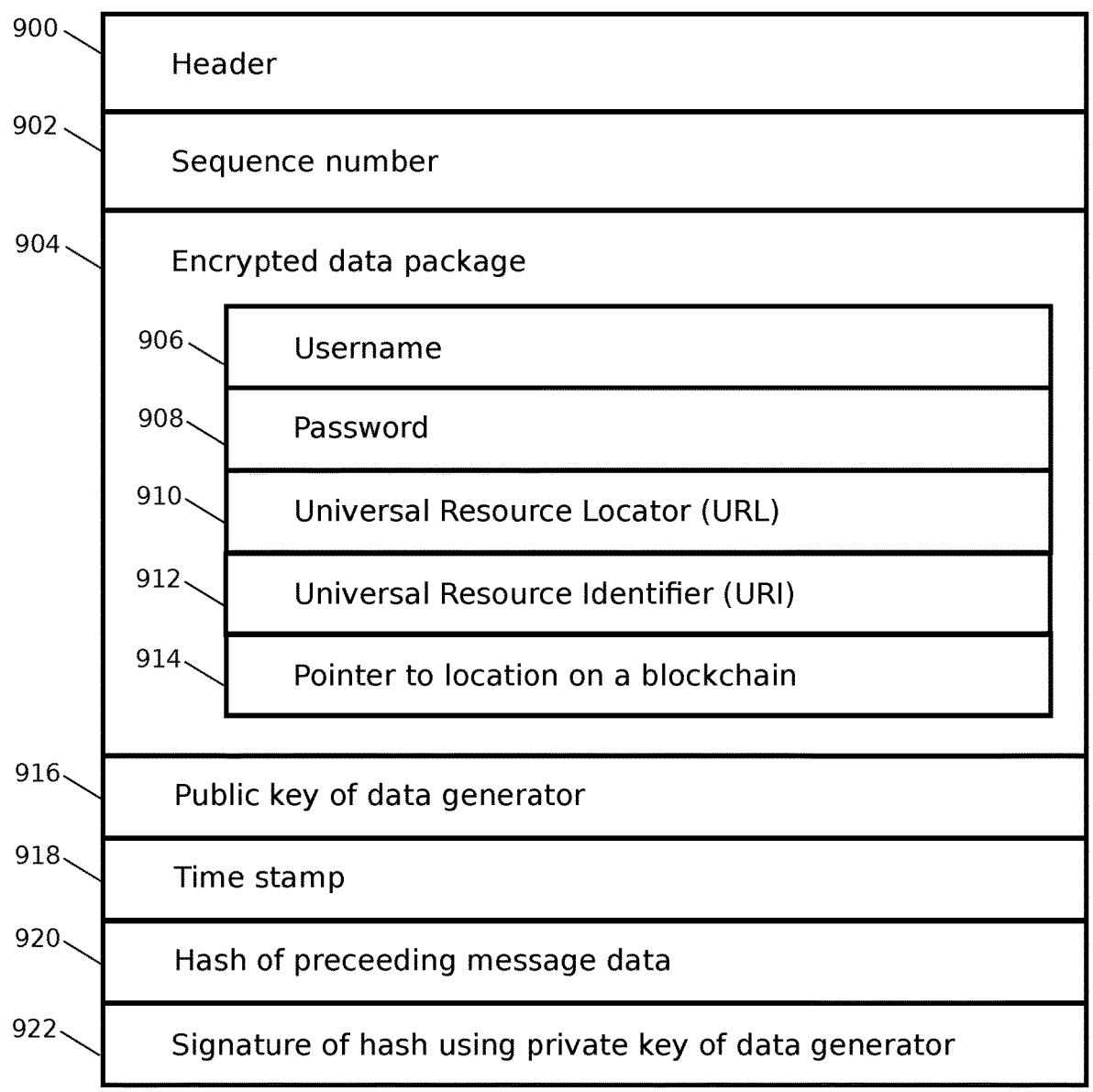
FIG. 9 is a block diagram illustrating a possible embodiment of a data package produced by a data generator comprising a pointer to a further data produced by said data generator, in accordance with an embodiment of the present disclosure.

In FIG. 9 a possible embodiment of a data pointer produced by a data generator comprising a pointer to a further data produced by said data generator, is presented. A data record may comprise a data pointer, allowing data generated by the data generator to be stored off the blockchain.

The data pointer may comprise a header 900, which may comprise: an identifier indicating that the data pointer contains a pointer to data, a size of the data pointer, a protocol for the data pointer, a structure of the data pointer.

The data pointer may comprise a sequence number 902, which may indicate a data in the data pointer is a part of a sequence of data, and may indicate where in the sequence of data the data is positioned.

The data pointer may comprise an encrypted data package 904, comprising the pointer and associated resources. The data package may be encrypted with a symmetric key encryption algorithm such as: Blowfish, DES, IDEA, MARS, RC2-5, Rijndael, Serpent, Triple-DES, Twofish, or some other symmetric key encryption algorithm. In an alternate embodiment the data package may not be encrypted.

The encrypted data package 904 may comprise a username 906 and a password 908 that are required to access data stored at a location indicated by the pointer.

The encrypted data package 904 may comprise a Universal Resource Locator (URL) 910. The URL 910 may indicate a network location, website, file transfer protocol server, or other resource location at which a resource may be found and retrieved, together with a protocol for retrieving the resource. For example, the data generated by the data generator may be the resource, stored at the location, referenced by the URL 910.

The encrypted data package 904 may comprise a Universal Resource Identifier (URI) 912. The URI 912 may indicate a named resource and possibly a location at which the named resource may be found and retrieved. For example, a data produced by the data generator may be the named resource, and the URI 912 may comprise a filename, an international standard book number (ISBN), an International Standard Recording Code (ISRC), an International Standard Musical Work Code (ISWC), a Universal Product Code (UPC), or other identifier for the data.

The encrypted data package 904 may comprise a pointer to a location on a blockchain 914, which may indicate where on the blockchain an other data record may be found. In alternate embodiments the pointer to the location on the blockchain 914 may comprise: a past block height, a future block height, a past blockchain file size, a future blockchain file size, a subsequent block with a subsequently determined identifier, a past time stamp, or a future time stamp.

The data pointer may comprise a public key of the data generator 916, which may be one of: an ECDSA public key, and ElGamal public key, a DSA public key, an RSA public key, or some other public key associated with an asymmetric key system.

The data pointer may comprise a time stamp 918. In an embodiment the time stamp may comprise a time at which the data pointer was generated. In an alternate embodiment the time stamp may comprise a time at which the data was generated by the data generator. The data pointer may also comprise a plurality of time stamps.

The data pointer may comprise a hash of all or part of a preceding data pointer contents 920. The hash may be calculated using a cryptographic hash algorithm, for example: SHA, RIPEMD, Whirlpool, Scrypt, HAS-160, BLAKE, or other cryptographic hash function applied to all or part of the preceding content of the message, where a hash output cannot be determined from a hash input other than by an application of the cryptographic hash function to the hash input.

The data pointer may also comprise a digital signature 922, generated using a private key associated with the public key 916 and the hash 920, in order to provide for a veracity of the data pointer. The digital signature algorithm used may be one of ECDSA, DSA, RSA, or some other secure asymmetric key digital signing algorithm.

Figure 10:
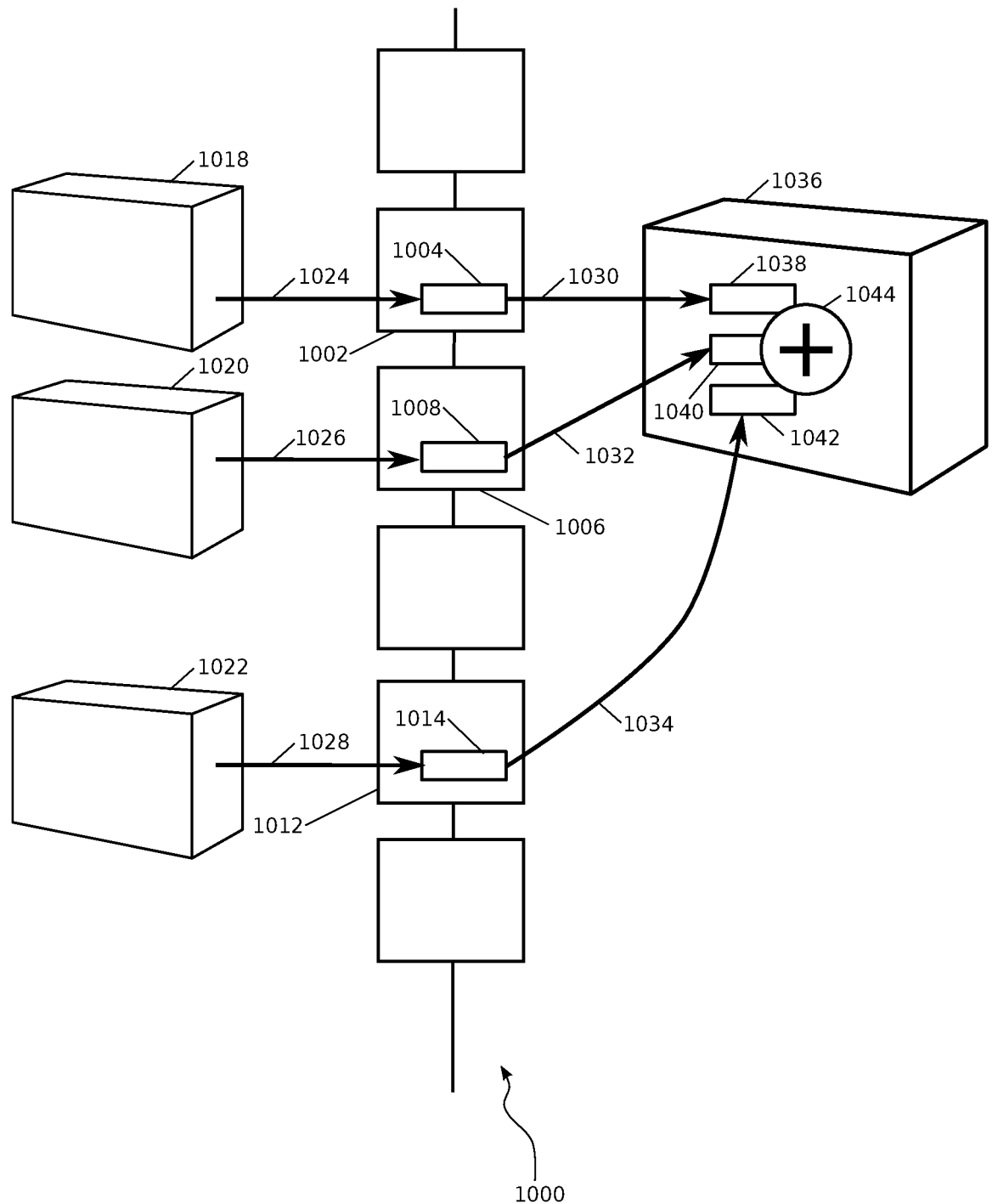
FIG. 10 is a diagram illustrating an authorization of ownership, by a data owner, of data generated by a data generator, wherein a plurality of authorizers provide said authorization, in accordance with an embodiment of the present disclosure.

In FIG. 10 authorization of ownership, by a data owner, of data generated by a data generator, through a plurality of authorizers providing said authorization, is illustrated, in accordance with an embodiment of the present disclosure.

In the embodiment, actions may commence on a blockchain 1000, in which a first of the plurality of authorizers 1018 submits a first assignment record 1004 for inclusion in a block 1002 of the blockchain 1000. In FIG. 10 a first action of submitting the first authorization is indicated by 1024.

Subsequently, actions may proceed by a second of the plurality of authorizers 1020 submitting a second assignment record 1008 for inclusion in a second block 1006 of the blockchain 1000. In FIG. 10 a second action of submitting the second authorization is indicated by 1026.

In alternate embodiments there may be further authorizers, but for the purposes of an example for the embodiment currently presented there are two authorizers.

At a later time, a data owner 1022 may submit a permission record 1014 to a further block 1012 in the blockchain. In FIG. 10 a permission action of submitting the permission record 1014 is indicated by 1028.

In FIG. 8 a validator 817 was presented, and in FIG. 7 a data generator 102 was presented, both initially performing a same role of validating assignment records and permission records. For the purpose of the embodiment of FIG. 10 under discussion, a device 1036 may be either a validator or a data generator performing the same role.

The device 1036 may extract the permission record 1014, the first assignment record 1004, and the second assignment record 1008 from the blockchain 1000. An action of extracting the first assignment record 1004 is indicated by 1030, resulting in a copy of the first assignment record 1038, a second action of extracting the second assignment record 1008 is indicated by 1032, resulting in a copy of the second assignment record 1040, and an action of extracting the permission record 1014 is indicated by 1034, resulting in a copy of the permission record 1042.

The device 1036 may then analyze the contents of the copy of the first assignment record 1038, the copy of the second assignment record 1040, and the copy of the permission record 1042, to validate a plurality of digital signatures within the records. A function representing a validation action is represented by 1044.

If the function 1044 determines the records to be valid, the device 1036 may then proceed to grant access to the data to the data receiver, as previously disclosed.

In an embodiment, the function 1044 may comprise a requirement that each assignment record is valid. This encompasses what is known to those skilled in the art as a "M of M" signature requirement.

In an alternate embodiment, the function 1044 may comprise a requirement that a given number or given percentage of all assignment records are valid. This encompasses what is known to those skilled in the art as a "N of M" signature requirement, where N may be less than or equal to M.

Through the above embodiments a "multi-signature" authorization procedure is hereby provided.

Figure 11:
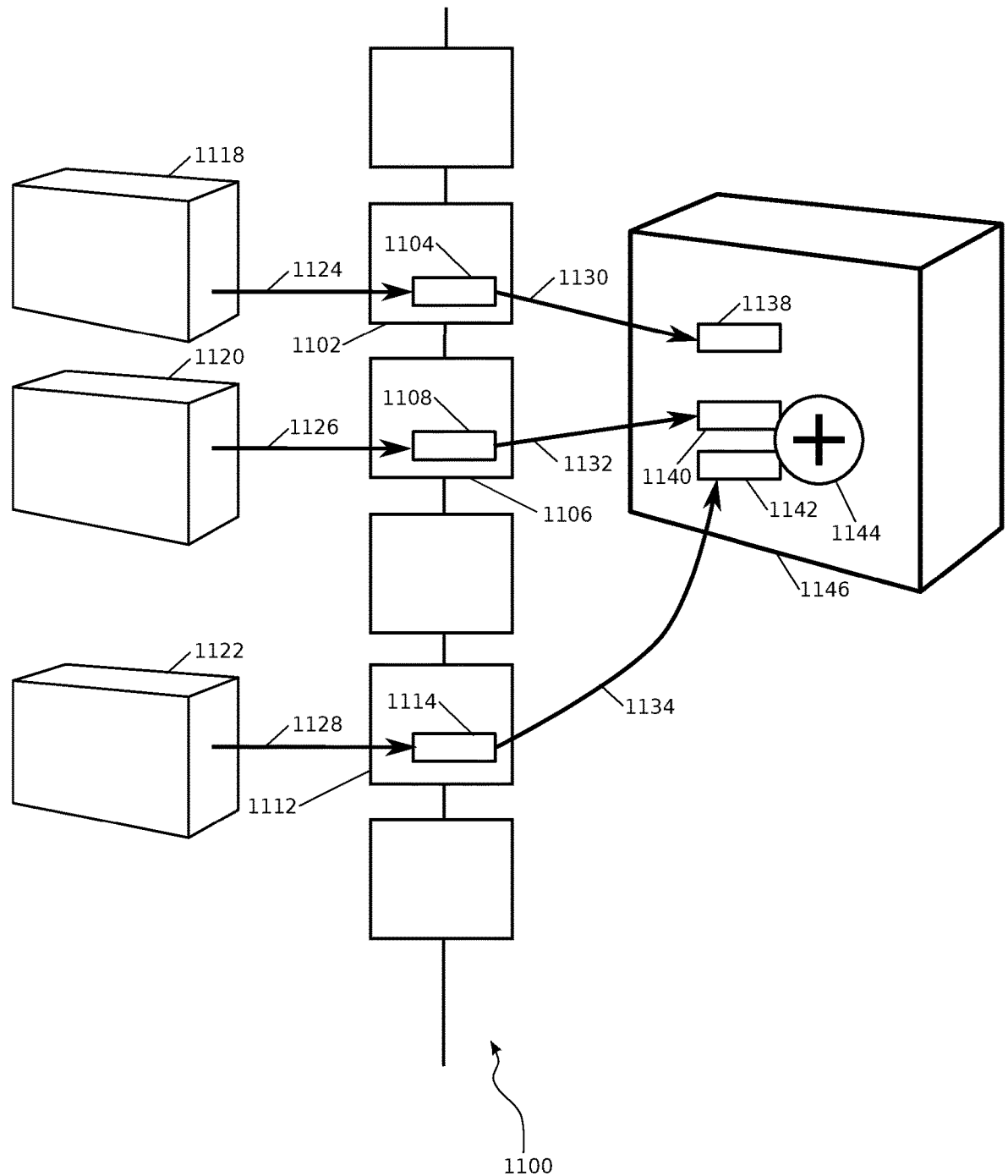
FIG. 11 is a diagram illustrating a permission of a release of data to a data receiver, wherein a plurality of data owners provide said permission, in accordance with an embodiment of the present disclosure.

In FIG. 11 permission of a release of data to a data receiver, wherein a plurality of data owners provide said permission, is illustrated, in accordance with an embodiment of the present disclosure.

In the embodiment, actions may commence on a blockchain 1100, in which an authorizer 1118 submits an assignment record 1104 for inclusion in a block 1102 of the blockchain 1100. In FIG. 11 an action of submitting an authorization through the assignment record 1104 is indicated by 1124. Said assignment record may authorize a plurality of data owners to grant consent or permission to a data receiver to access data.

Subsequently, actions may proceed by a first of the plurality of data owners 1120 submitting a first permission record 1108 for inclusion in a second block 1106 of the blockchain 1100. In FIG. 11 a first action of submitting the first permission record 1108 is indicated by 1126.

At a later time, a second of the plurality of data owners 1122 may submit a second permission record 1114 to a further block 1112 in the blockchain. In FIG. 11 a second action of submitting the second permission record 1114 is indicated by 1128.

In alternate embodiments there may be further data owners, but for the purposes of an example for the embodiment currently presented, there are two data owners.

In FIG. 8 a validator 817 was presented, and in FIG. 7 a data generator 102 was presented, both initially performing a same role of validating assignment records and permission records. For the purpose of the embodiment of FIG. 11 under discussion, a device 1146 may be either a validator or a data generator performing the same role.

The device 1146 may extract the assignment record 1104, the first permission record 1108, and the second assignment record 1114 from the blockchain 1100. An action of extracting the assignment record 1104 is indicated by 1130, resulting in a copy of the first assignment record 1138. A first action of extracting the first permission record 1108 is indicated by 1132, resulting in a copy of the permission record 1140, and a second action of extracting the second permission record 1114 is indicated by 1134, resulting in a copy of the second permission record 1142.

The device 1146 may then analyze the contents of the copy of the assignment record 1138 in order to confirm that the first data owner 1120 and the second data owner 1122 are authorized to grant access to data generated by the device 1146.

The device 1146 may then analyze the copy of the first permission record 1140, and the copy of the second permission record 1142, to validate a plurality of digital signatures within the records. A function representing a validation action is represented by 1144.

If the function 1144 determines the permission records to be valid, the device 1146 may then proceed to grant access to the data to the data receiver, as previously disclosed.

In an embodiment, the function 1144 may comprise a requirement that each permission record is valid. This encompasses what is known to those skilled in the art as a "M of M" signature requirement.

In an alternate embodiment, the function 1144 may comprise a requirement that a given number or given percentage of all permission records are valid. This encompasses what is known to those skilled in the art as a "N of M" signature requirement, where N may be less than or equal to M.

Through the above embodiments a "multi-signature" permission procedure is hereby provided.

In alternate embodiments of the present disclosure, a multi-signature requirement may be present for both assignment records and permission records.

Figure 12:
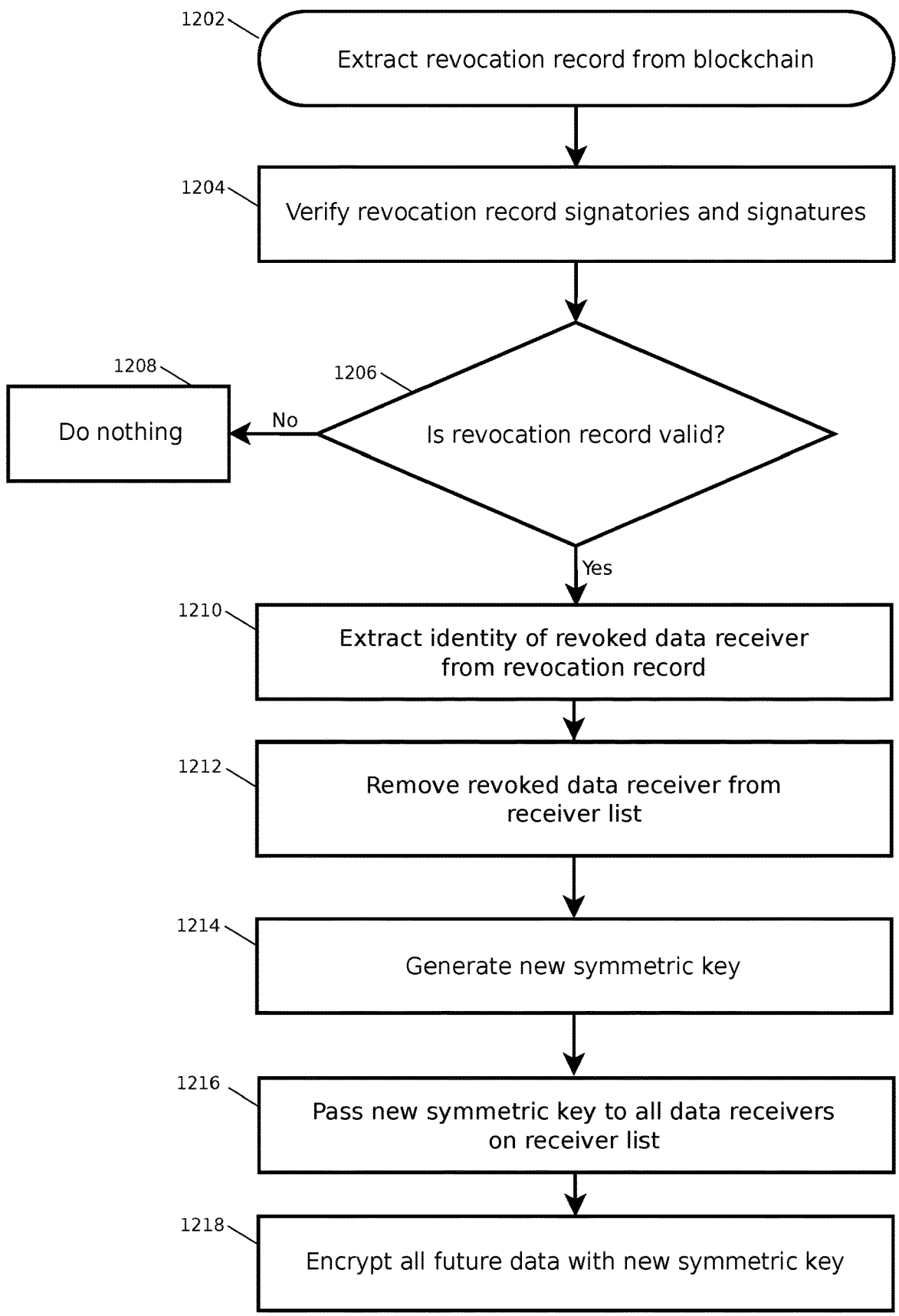
FIG. 12 is a flow diagram providing a general overview of a method and apparatus for subsequently revoking access to a data, in accordance with an embodiment of the present disclosure.

In FIG. 12 a flow diagram providing a general overview of a method and apparatus for subsequently revoking access to a data, in accordance with an embodiment of the present disclosure, is presented.

Operations for revoking a previously permitted data receiver may commence with a data generator extracting a revocation record from the blockchain, as indicated in step 1202. An example of the revocation record was previously shown in FIG. 6.

The data generator may then proceed by verifying a validity of the revocation record by checking an authority of a record signatory and a veracity of a digital signature, as shown in step 1204.

In step 1206, the data generator may determine that the revocation record is not valid, and may proceed to step 1208, in which the data generator may take no further action, effectively disregarding the revocation record.

Alternatively, in step 1206, the data generator may determine that the revocation record is valid, and may proceed to step 1210.

In step 1210, the data generator may extract an identity of a revoked data receiver from the revocation record. The identity may comprise: a public key, an IP address, an email address, or some other identification credential.

In an embodiment the data generator may remove the revoked data receiver from a list of permitted data receivers, as shown in step 1212.

The data generator may then proceed by generating a new symmetric key, as shown in step 1214.

As shown in step 1216, the data generator may then pass the new symmetric key to a plurality of data receivers specified by the list of permitted data receivers.

The data receiver may then encrypt a future data generated using the new symmetric key, as shown in step 1218.

Through the methods and processes described above, the revoked data receiver may then no longer be able to decrypt the future data.

Figure 13:
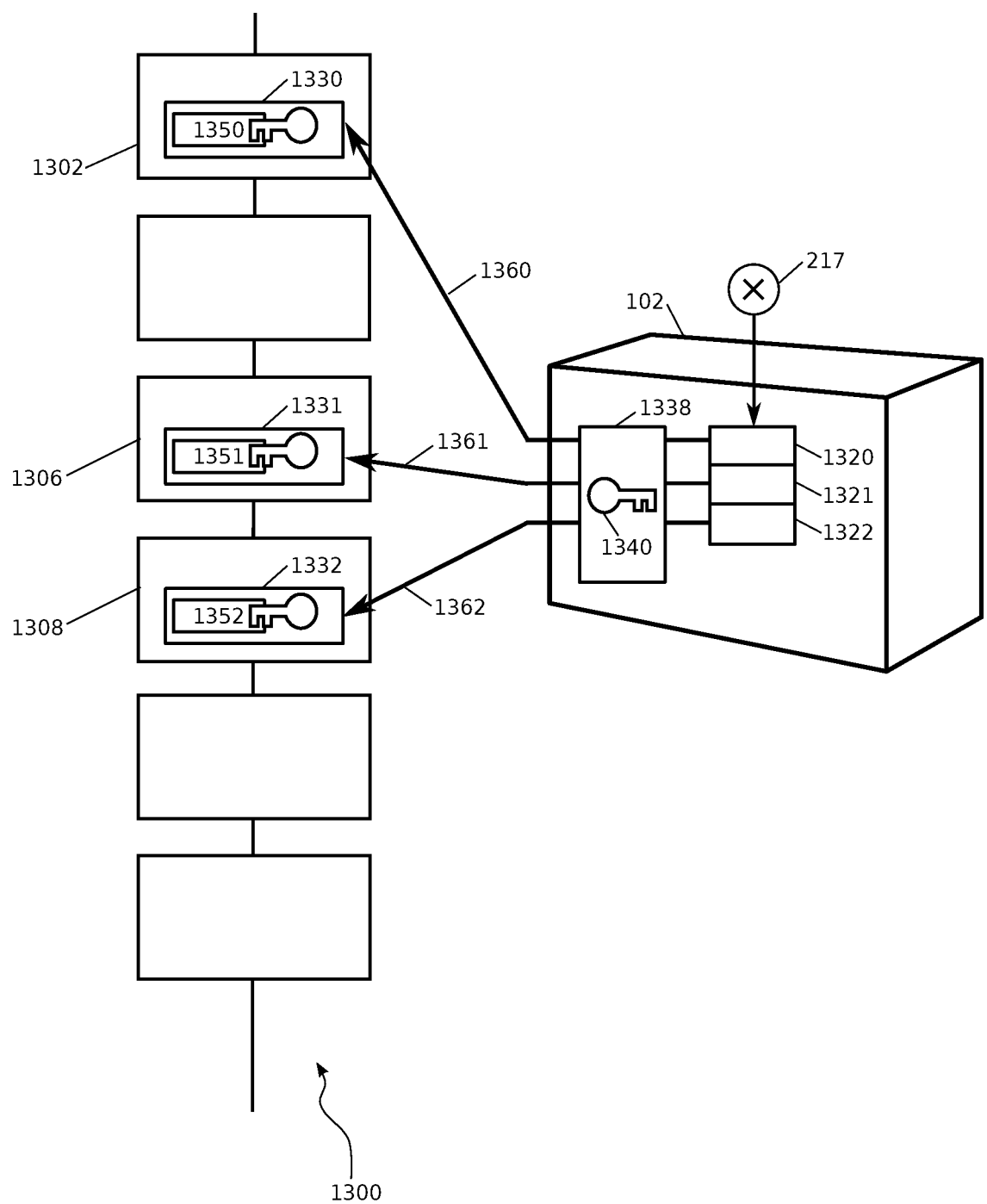
FIG. 13 is a diagram illustrating a generation of a stream of data packages by a data generator, in accordance with an embodiment of the present disclosure.

FIG. 13 presents a diagram illustrating how a data stream may be embodied, whereby the data generator generates and packages a plurality of data over time, encrypting and submitting an each portion of the plurality of data to a blockchain 1300 over a period of time, using a symmetric key 1340.

In an embodiment, the data generator 102 may receive a data from, for example, the sensor 217. In other embodiments data may be received from a plurality of sensors, or through computations performed on other data, for example data within a database. The data generator may package the data into a plurality of data packages over time, represented by 1320, 1321, and 1322.

The data generator 102 may produce a symmetric key 1340, and may comprise a cryptography system 1338 for encrypting data to be included in a data record. Said cryptography system 1338 may comprise a module embodied in hardware, or a programmatic routine embodied in software.

In the current example, the data generator 102 may produce a first of the plurality of data packages 1320 at time T1, and may encrypt the first of the plurality of data packages using the cryptographic module 1338, and may then generate a data record 1330, transmitted to the blockchain 1300 as shown by 1360.

The data generator 102 may then produce a second 1321, and third 1322 of the plurality of data packages at times T2, and T3 respectively, with $$T1<T2<T3,$$

and may encrypt each of the plurality of data packages using the cryptographic module 1338, and may at each time generate a data record, transmitted to the blockchain 1300 as shown by 1361, and 1362 respectively.

In other embodiments the data generator may choose to hold back a one or more of the plurality of data packages and transmit the plurality of data packages in other than a monotonic time sequence, for example $$T2<T1<T3.$$

Returning to the present example, the first data record 1330 may be recorded in a first block 1302. The second data record 1331 may be recorded in a second block 1306, and the third data record 1332 may be recorded in a third block 1308. Those skilled in the art will recognize that further data records may be generated as required via a same process.

In each case, data records may comprise an encrypted copy of a data package. For example, the data record 1330 may comprise a data package 1350 comprising an encrypted copy of the data package 1320 encrypted with the symmetric key 1340. Similarly the data record 1331 may comprise a data package 1351 comprising an encrypted copy of the data package 1321 encrypted with the symmetric key 1340, and the data record 1332 may comprise a data package 1352 comprising an encrypted copy of the data package 1322 encrypted with the symmetric key 1340.

Through these methods and processes the data generator 102 may record a sequence of data packages on the blockchain 1300 in a secure manner.

Figure 14:
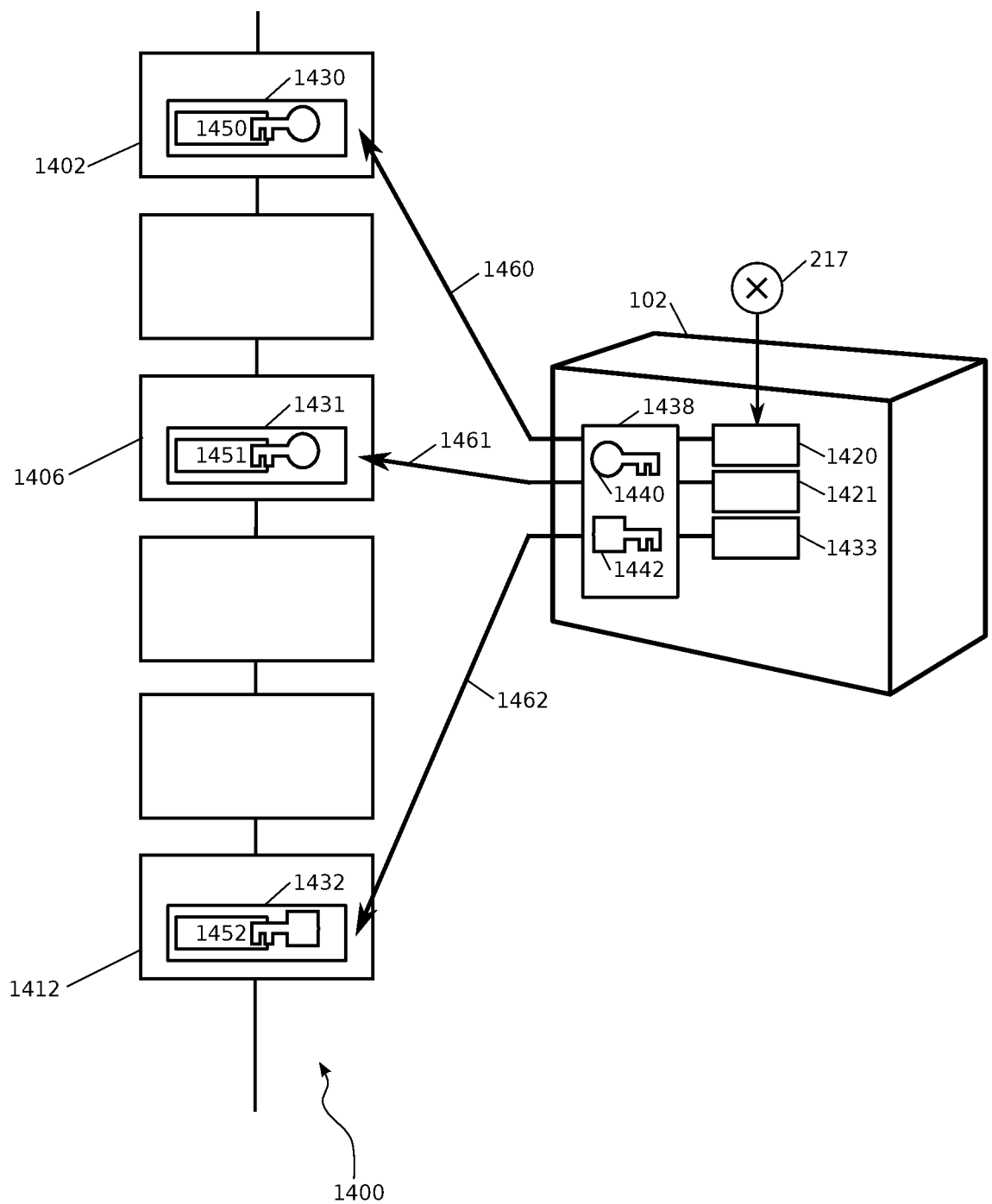
FIG. 14 is a diagram illustrating a generation of a stream of data packages by a data generator, followed by a generation of a second stream of data packages, after detecting a revocation record on a blockchain, in accordance with an embodiment of the present disclosure.

In FIG. 14 we now proceed to an illustration of an embodiment of a data stream in which the symmetric key is changed, due to a revocation of one or more data receivers.

In this embodiment, the data generator 102 may again receive a data from, for example, the sensor 217. In other embodiments data may be received from a plurality of sensors, from a database, or through computations performed on other data. The data generator 102 may package the data into a plurality of data packages over time, represented by 1420, 1421, and 1433. The data generator 102 may transform the data prior to packaging the data into data packages.

The data generator 102 may produce an initial symmetric key 1440, and may comprise a cryptography system 1438 for encrypting data to be included in a data record. Said cryptography system 1438 may comprise a module embodied in hardware, or a programmatic routine embodied in software.

The data generator 102 may produce a first of the plurality of data packages 1420 at time T1, and may encrypt the first of the plurality of data packages using the cryptographic module 1438 and the initial symmetric key 1440, and may then generate a data record, transmitted to the blockchain 1400 as shown by 1460.

The data generator 102 may then produce a second of the plurality of data packages 1421 at time T2, with $$T1<T2,$$

and may encrypt the second of the plurality of data packages 1421 using the cryptographic module 1438 and the initial symmetric key 1440, and may then generate a data record, transmitted to the blockchain 1400 as shown by 1461.

The data generator 102 may then detect a revocation record on the blockchain 1400 for a data receiver on a receiver list maintained by the data generator 102. This may cause the data generator 102 to generate a new symmetric key 1442.

The data generator 102 may then produce a third of the plurality of data packages 1433 at time T3, with $$T1<T2<T3,$$

and may encrypt the third of the plurality of data packages 1433 using the cryptographic module 1438 and the new symmetric key 1442, and may generate a data record, transmitted to the blockchain 1400 as shown by 1462.

In other embodiments the data generator may choose to hold back a one or more of the plurality of data packages and transmit the plurality of data packages in other than a monotonic time sequence, for example $$T2<T1<T3.$$

Returning to the present example, the first data record 1430 is recorded in a first block 1402. The second data record 1431 is recorded in a second block 1406, and the third data record 1432 is recorded in a third block 1412. Those skilled in the art will recognize that further data records may be generated as required via a same process.

In each case, data records may comprise an encrypted copy of a data package. For example, the data record 1430 may comprise a data package 1450 comprising an encrypted copy of the data package 1420 encrypted with the initial symmetric key 1440. Similarly the data record 1431 may comprise a data package 1451 comprising an encrypted copy of the data package 1421 encrypted with the initial symmetric key 1440. Finally, the data record 1432 may comprise a data package 1452 comprising an encrypted copy of the data package 1433, encrypted with the new symmetric key 1442.

Through these methods and processes the data generator 102 may record a sequence of data packages on the blockchain 1400 in a secure manner, and after receiving a revocation record, the data generator 102 may ensure that subsequent data may not be read or accessed by a revoked data receiver.

Figure 15:
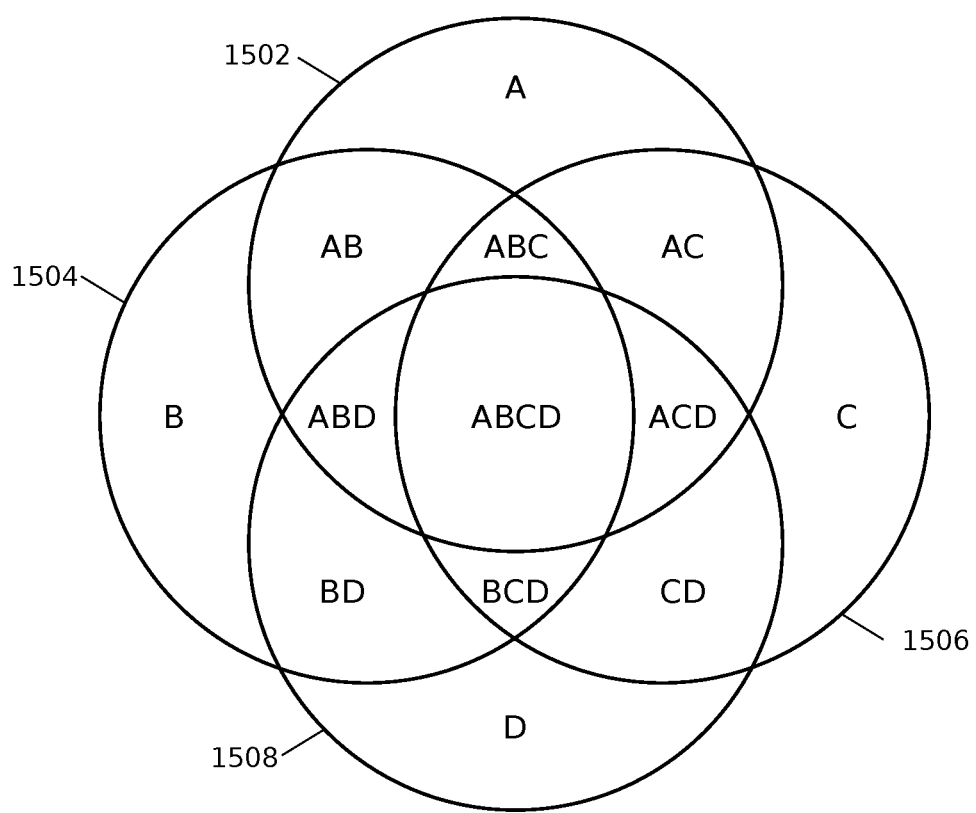
FIG. 15 is a Venn diagram enumerating all possible combinations of a plurality of participants on a blockchain, wherein a one or more of the plurality of participants may also perform the function of one or more of: a data generator, a data owner, a data receiver, in accordance with an embodiment of the present disclosure.

FIG. 15 depicts a Venn diagram in which possible combinations of the data generator 1502 represented by A, authorizer 1504 represented by B, data owner 1506 represented by C, and data receiver 1508 represented by D, being instantiated in a same device or entity, are presented.

In an embodiment of the current disclosure, each entity may be instantiated in a separate entity, namely A, B, C and D.

In a different embodiment, each entity may be instantiated in a same entity, namely ABCD.

In a different embodiment A and B may be instantiated in one entity, AB, and C and D may be instantiated in an other entity, CD.

In summary, a total possible enumeration of combinations of combined or separate instantiations of entities within the system, that may embody the current disclosure, consists of: (A,B,C,D), (AB,C,D), (AC,B,D), (AD,B,C), (A,BC,D), (A,BD,C), (A,B,CD), (AB,CD), (AC,BD), (AD,BC), (ABC,D), (ABD,C), (ACD,B), (A,BCD), (ABCD).

Figure 16:
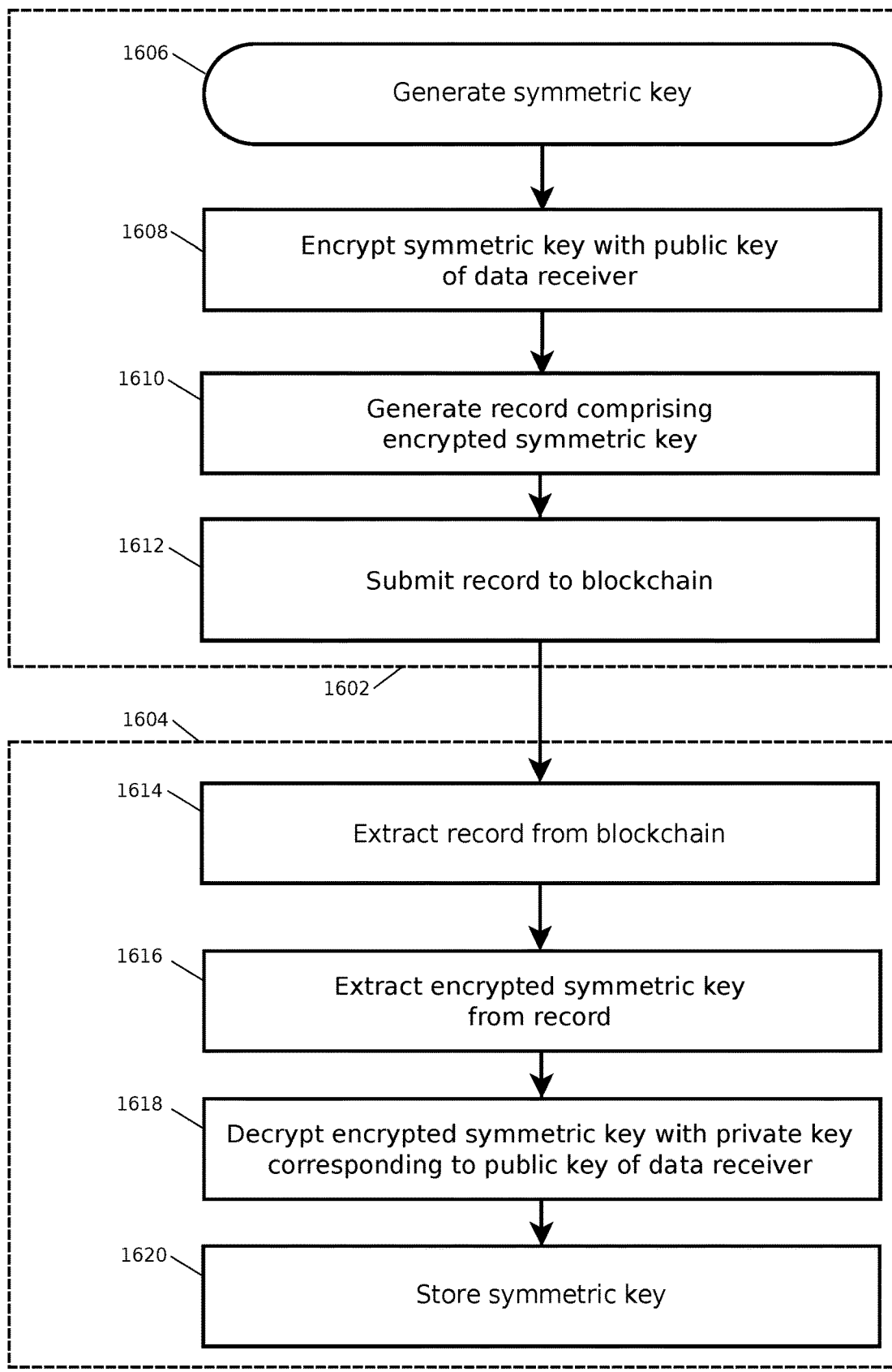
FIG. 16 is a flow chart illustrating a method for passing a symmetric key from a data generator to a data receiver over a blockchain, in accordance with an embodiment of the present disclosure.

In FIG. 16 a flow chart is presented illustrating a method for passing a symmetric key from a data creator 1602 to a data receiver 1604 over a blockchain, in accordance with an embodiment of the present disclosure.

Operations may commence by the data creator 1602 generating a symmetric key, as shown in step 1606. The symmetric key may comprise a cryptographic key generated using a symmetric key encryption algorithm such as: Blowfish, DES, IDEA, MARS, RC2-5, Rijndael, Serpent, Triple-DES, Twofish, or some other symmetric key encryption algorithm.

Operations may then proceed by the data creator 1602 encrypting the symmetric key with a public key of the data receiver 1604. In an embodiment the data creator 1602 may previously have obtained the public key from a prior permission record or assignment record. In another embodiment the data creator 1602 may have obtained the public key of the data receiver 1604 from the identification record on the blockchain, as previously disclosed.

The data creator 1602 may then generate a record comprising the symmetric key encrypted with the public key of the data receiver 1604, as shown in step 1610. The record may also comprise a public key of the data creator 1602. The record may be digitally signed by the data creator 1602 using a private key associated with the public key of the data creator.

The data creator 1602 may then submit the record to a blockchain, as shown in step 1612.

Operations may now proceed by the data receiver 1604 extracting the record from the blockchain, as shown in step 1614.

The data receiver 1604 may then extract the symmetric key encrypted with the public key of the data receiver 1604 from the record, as shown in step 1616.

The data receiver 1604 may then decrypt the symmetric key encrypted with the public key of the data receiver 1604, by using a private key corresponding to the public key of the data receiver 1604, as shown in step 1618.

The data receiver 1604 may then store the symmetric key, for example: in memory, in secure persistent storage, or in some other volatile or non-volatile storage medium.

Through the above steps, the symmetric key may be transferred securely from the data generator 1602 to the data receiver 1604. The symmetric key may then subsequently be used by the data receiver 1604 to decrypt data submitted to the blockchain by the data generator 1602.

The technology described herein is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, processor-based systems, programmable consumer electronics, network PCs, minicomputers, mainframe computers, smartphones, tablets, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor such as a Pentium® processor, a Pentium® Pro processor, a 8051 processor, a MIPS® processor, a Power PC® processor, an Arm®-based Processor, or an Alpha® processor. In addition, the processor may be any conventional special purpose processor such as a digital signal processor or a graphics processor. The processor typically has conventional address lines, conventional data lines, and one or more conventional control lines.

The system is comprised of various modules as discussed in detail. As can be appreciated by one of ordinary skill in the art, each of the modules comprises various sub-routines, procedures, definitional statements and macros. Each of the modules are typically separately compiled and linked into a single executable program. Therefore, the description of each of the modules is used for convenience to describe the functionality of the preferred system. Thus, the processes that are undergone by each of the modules may be arbitrarily redistributed to one of the other modules, combined together in a single module, or made available in, for example, a shareable dynamic-link library.

The system may be used in connection with various operating systems such as Linux®, UNIX®, iOS®, or Microsoft Windows®.

The system may be written in any conventional programming language such as C, C++, Pascal, or Java, FORTRAN, and run under a conventional operating system. C, C++, Pascal, Java, and FORTRAN are industry standard programming languages for which many commercial compilers can be used to create executable code. The system may also be written using interpreted languages such as Perl, Python or Ruby, or languages that may either be compiled or interpreted, such as BASIC or Lisp.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, micro-controller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more example embodiments, the functions and methods described may be implemented in hardware, software, or firmware executed on a processor, or any combination thereof. If implemented in software, the functions may be stored on or transmitted over as one or more instructions or code on a computer-readable medium. Computer-readable media include both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the disclosure should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting.

As will be appreciated from the above discussion, an advantage of the systems and methods of this disclosure includes ensuring that an owner of data generated by a producer of data may correctly authorize or revoke access to said data produced by a data generator for use by a consumer of the data in a decentralized fashion without recourse to a central authority, namely through the medium of a blockchain.

What is claimed is:

1. A method for enabling a decryption of a data package encrypted with a symmetric key, comprising:
    transmitting a data record comprising the data package encrypted with the symmetric key to a blockchain, by a data generator;
    transmitting a plurality of assignment records to the blockchain, by a plurality of authorizers, said assignment records asserting ownership of the data package produced by the data generator to a data owner;
    transmitting a permission record to the blockchain, by the data owner, said permission record granting permission to a data receiver to access the data package produced by the data generator;
    verifying, by the data generator, that a number of the plurality of assignment records totals above a predetermined number, that each of the number of the plurality of assignment records is digitally signed by a corresponding one of the plurality of authorizers, and that the permission record is digitally signed by the data owner;
    on successful verification, releasing the symmetric key, by the data generator, to the data receiver;
    retrieving from the blockchain, by the data receiver, the data record comprising the data package; and
    decrypting, the data package using the symmetric key, by the data receiver.

2. The method of claim 1, wherein the data record comprises a pointer to a location of a further data, said further data encrypted with the symmetric key, and stored on one or more of: a computer server, a database, a file system, and a removable computer data storage medium.

3. The method of claim 1, wherein the symmetric key is used by the data generator to encrypt a plurality of data packages, transmitted to the blockchain as a plurality of data records over a period of time.

4. The method of claim 1, further comprising a plurality of data owners and a plurality of permission records, wherein each of the plurality of data owners transmits a corresponding permission record from the plurality of permission records to the blockchain, each corresponding permission record asserts permission to access a content of the data record by the data receiver, and further comprising:
    verifying, by the data generator, that a number of the plurality of permission records totals above a predetermined number; and
    verifying, by the data generator, that each of the number of the plurality of permission records is digitally signed by a corresponding one of the plurality of data owners.

5. A plurality of network connected devices, each comprising: one or more processors, and storage media comprising computer instructions, said plurality of network connected devices being connectible via a network to each other, arranged such that when computer instructions are executed on the one or more processors of a one or more of the plurality of network connected devices, operations are caused for enabling a decryption of a data package encrypted with a symmetric key, comprising:
- transmitting to a blockchain, by a first of the plurality of network connected devices, a data record comprising the data package produced by the first of the plurality of network connected devices and encrypted with a symmetric key;
- transmitting to the blockchain, by a second plurality of network connected devices, a plurality of assignment records assigning ownership of the data package produced by the first of the plurality of network connected devices to a third of the plurality of network connected devices;
- transmitting to the blockchain, by a second of the plurality of network connected devices, a permission record granting permission to a third of the plurality of network connected devices to access the data package produced by the first of the plurality of network connected devices;
- verifying, by the first of the plurality of network connected devices, that a number of the plurality of assignment records totals above a predetermined number, that each of the number of the plurality of assignment records is digitally signed by a corresponding one of the second plurality of network connected devices, that and the permission record is digitally signed by the second of the plurality of network connected devices;
- on successful verification, releasing the symmetric key, by the first of the plurality of network connected devices, to the third of the plurality of network connected devices;
- retrieving from the blockchain, by the third of the plurality of network connected devices, the data record comprising the data package produced by the first of the plurality of network connected devices;
- decrypting using the symmetric key, by the third of the plurality of network connected devices, the data package produced by the first of the plurality of network connected devices.

6. The plurality of network connected devices of claim 5, wherein the data package produced by the first of the plurality of network connected devices comprises a pointer to a location of further data, said further data encrypted with the symmetric key by the first of the plurality of network connected devices, and stored on a one or more of: a computer server, a database, a file system, and a removable computer data storage medium.

7. The plurality of network connected devices of claim 5, wherein the symmetric key is used by the first of the plurality of network connected devices to encrypt a plurality of data packages produced by the first of the plurality of network connected devices, said plurality of data packages transmitted to the blockchain over a period of time.

8. The plurality of network connected devices of claim 5, further comprising a third plurality of network connected devices forming a subset of the plurality of network connected devices and a plurality of permission records, wherein each one of the third plurality of network connected devices transmits a corresponding permission record from the plurality of permission records to the blockchain, each corresponding permission record asserts permission to access a content of the data record produced by the first of the plurality of network connected devices by the third of the plurality of network connected devices, and further comprising:
- verifying, by the first of the plurality of network connected devices, that a number of the plurality of permission records totals above a predetermined number; and
- verifying, by the first of the plurality of network connected devices, that each of the number of the plurality of permission records is digitally signed by a corresponding one of the third plurality of network connected devices.

* * * * *